United States Patent
Komatsu et al.

(10) Patent No.: US 8,700,215 B2
(45) Date of Patent: Apr. 15, 2014

(54) CONTROL APPARATUS AND CONTROL METHOD OF ELASTIC BODY ACTUATOR AS WELL AS CONTROL PROGRAM THEREOF

(75) Inventors: Mayumi Komatsu, Kyoto (JP); Yasunao Okazaki, Shiga (JP)

(73) Assignee: Panasonic Corporation, Osaka (JP)

( * ) Notice: Subject to any disclaimer, the term of this patent is extended or adjusted under 35 U.S.C. 154(b) by 696 days.

(21) Appl. No.: 12/994,309

(22) PCT Filed: Jan. 5, 2010

(86) PCT No.: PCT/JP2010/000009
§ 371 (c)(1),
(2), (4) Date: Nov. 23, 2010

(87) PCT Pub. No.: WO2010/082452
PCT Pub. Date: Jul. 22, 2010

(65) Prior Publication Data
US 2011/0078508 A1    Mar. 31, 2011

(30) Foreign Application Priority Data
Jan. 13, 2009  (JP) .................. 2009-004585

(51) Int. Cl.
*G06F 11/27*    (2006.01)
*G05B 19/404*   (2006.01)

(52) U.S. Cl.
USPC ............................... 700/254; 714/48

(58) Field of Classification Search
USPC .......... 700/245, 247, 254, 259; 901/2, 11, 901/14–15, 22, 30; 714/37, E11.169, 48, 49
See application file for complete search history.

(56) References Cited

U.S. PATENT DOCUMENTS

| | | | |
|---|---|---|---|
| 4,279,192 A | 7/1981 | Kleinwaks | |
| 7,260,450 B2 * | 8/2007 | Okazaki et al. | ............... 700/254 |

(Continued)

FOREIGN PATENT DOCUMENTS

| | | |
|---|---|---|
| CN | 1852790 | 10/2006 |
| JP | 2-116308 | 9/1990 |

(Continued)

OTHER PUBLICATIONS

International Search Report issued Feb. 9, 2010 in International (PCT) Application No. PCT/JP2010/000009.

(Continued)

*Primary Examiner* — Jason Holloway
(74) *Attorney, Agent, or Firm* — Wenderoth, Lind & Ponack, L.L.P.

(57) ABSTRACT

An inner pressure of an actuator is measured by a pressure measuring unit, and an amount of displacement of a movable mechanism is measured so that a position error compensation unit to which a desired value for the displacement and the measured value are inputted is allowed to compensate for a position error, and a desired value for a pressure difference of actuators that are competitively driven from the desired value is calculated by a desired pressure difference calculation unit, and an adjusted correcting value of the desired value for the pressure difference, obtained from the desired value of displacement and the measured value, is adjustably outputted from an adjustable desired inner-state correction unit, and thus, the outputs of these unit are inputted to a pressure difference error compensation unit so that a pressure difference error is compensated therewith.

13 Claims, 14 Drawing Sheets

(56) References Cited

U.S. PATENT DOCUMENTS

| | | | |
|---|---|---|---|
| 2006/0207419 A1* | 9/2006 | Okazaki et al. | 91/35 |
| 2007/0118252 A1* | 5/2007 | Okazaki et al. | 700/254 |

FOREIGN PATENT DOCUMENTS

| | | |
|---|---|---|
| JP | 3-3791 | 1/1991 |
| JP | 4-4302 | 1/1992 |
| JP | 7-236957 | 9/1995 |
| JP | 2000-10635 | 1/2000 |
| JP | 2005-95989 | 4/2005 |
| JP | 2006-18431 | 1/2006 |

OTHER PUBLICATIONS

Y. Okazaki et al., "Improvement of Positioning Accuracy of a 6-DOF Pneumatic Artificial Muscle Arm by Inner Pressure Control" (TA1-14-2), proceedings of the 46th Japan Joint Automatic Control Conference, Nov. 2003, pp. 193-196.

Yasunao Okazaki et al., "Development of a Human Safe, Lightweight Pliant Robot Arm by Pneumatic Muscles" (4S1-5), proceedings of the 52nd Annual Conference of the Institute of Systems, Control and Information Engineers (ISCIE), Kyoto, May 16-18, 2008, pp. 339-340.

Toshiro Noritsugu et al., "Control Performance of Rubber Artificial Muscle" (No. 93/0578), vol. 60-570, the Japan Society of Mechanical Engineers, 1994, pp. 193-198.

International Preliminary Report on Patentability and Written Opinion of the International Searching Authority issued Aug. 25, 2011 in International (PCT) Application No. PCT/JP2010/000009.

Chinese Office Action issued Jul. 22, 2013 in corresponding Chinese Patent Application No. 201080002401.0.

* cited by examiner

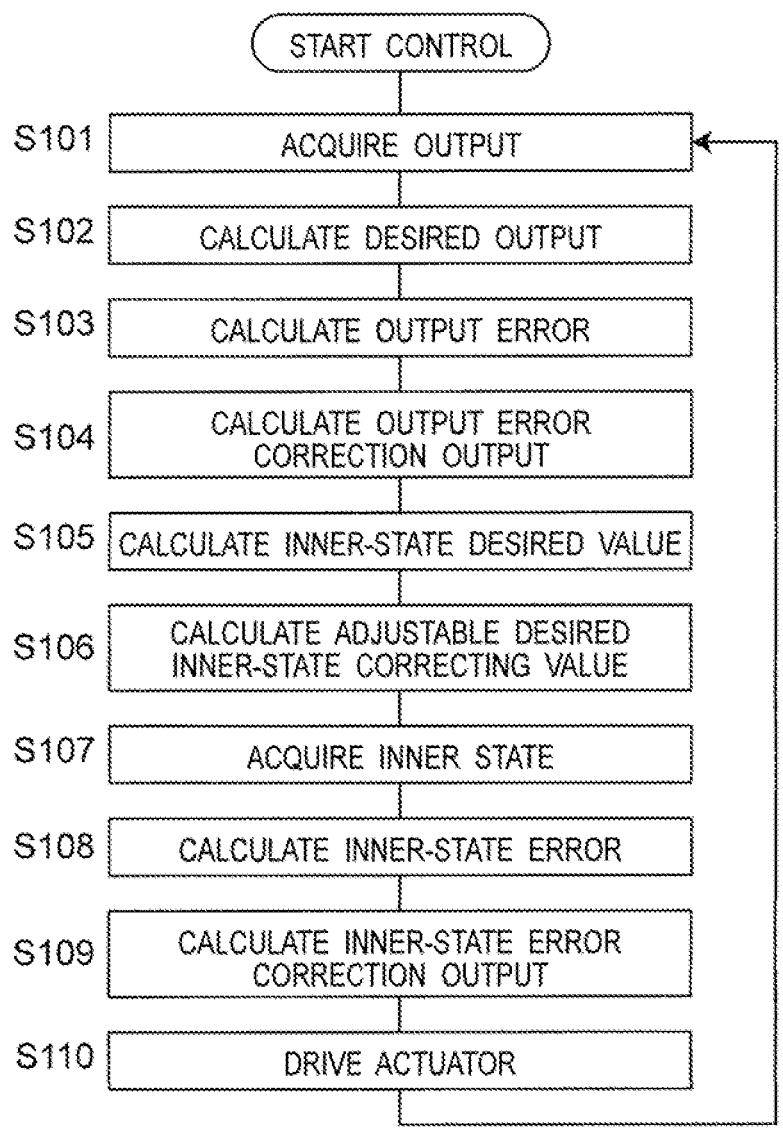

CONTROL APPARATUS AND CONTROL METHOD OF ELASTIC BODY ACTUATOR AS WELL AS CONTROL PROGRAM THEREOF

TECHNICAL FIELD

The present invention relates to an apparatus and method that control operations of an elastic body actuator driven by deformation of an elastic member, such as a fluid-pressure driving actuator and the like, and also relates to a control program thereof.

BACKGROUND ART

In recent years, developments of house-service robots such as pet robots or the like have been vigorously carried out, and it has been expected that in the future, more practical house-service robots, such as house-keeping support robots and the like, will be put into practical use. Since the house-service robot is used in a home, and needs to live together with people, its required specifications are made different from those of a conventional industrial robot.

In the case of the industrial robot, electric motors or speed reducers are used, and a high hand position precision, such as a repetitive precision of 0.1 mm or the like, has been achieved by a feed-back controlling operation with a high gain. However, such a mechanism driven by electric motors is high in rigidity, and tends to lack flexibility in most cases, resulting in an issue with safety.

In contrast, in the case of the house-service robot, such high precision with a repetitive precision of 0.1 mm or the like is not necessarily required, and more emphasis is placed on safety, that is, on such a characteristic as not to cause damage even in contact with a person. Therefore, the mechanism to be driven by electric motors, such as that of a conventional industrial robot, is not considered to be suitable for the field in which more emphasis is placed on safety, such as the field of the house-service robots, and flexible and safe robot arms are required.

In view of these issues, for example, a robot arm which utilizes a pneumatic actuator of McKibben type has been proposed. The McKibben type pneumatic actuator has a structure in which regulating means formed by fiber cords is placed on an outer surface of a tube-shaped elastic member made of a rubber material, with the two ends of the tube-shaped elastic member being air-tightly sealed with a sealing member. When an inner pressure is applied to the inner space of the tube-shaped elastic member by a compressive fluid such as air through fluid injection and discharge means, the tube-shaped elastic member tries to expand mainly in a radial direction; however, the expansion is converted to a motion in a center axis direction of the tube-shaped elastic member by the regulating means so that the overall length thereof is contracted. Since the actuator of the McKibben type is mainly composed of an elastic member, it is flexible and makes it possible to form a safe actuator having a light weight.

However, the fluid-pressure drive actuator, such as the actuator of the McKibben type, which is operated by a fluid pressure such as air, is poor in response characteristic due to influences of elastic characteristics caused by the compressive fluid, flow passage resistance, or the like. For this reason, the elastic body actuator has issues in that, for example, it is not possible to achieve a desired precision by using a conventional generally-used feed-back controlling operation.

In view of these issues, as a conventional technique, a control device has been disclosed (Patent Document 1) in which inner-state error compensation means is installed so that a control system for feeding back the inner state of the elastic body actuator is prepared, and desired inner-state determination means is also installed so that a control system for feeding forward a desired inner state is prepared; thus, the resulting control device makes it possible to carry out a high-speed controlling operation with high precision, and improved responsiveness, with little stationary error.

PRIOR ART DOCUMENT

Patent Document

Patent Document 1: JP-A No. 2005-95989

SUMMARY OF THE INVENTION

Issues to be Resolved by the Invention

In the desired inner-state determination means, however, since the results, obtained by carrying out preliminary experiments to measure a relationship between the output and the inner state, are expressed by an approximation polynomial equation or the like, the desired inner state cannot be altered in response to a change other than fluctuation parameters preliminarily presumed. For this reason, under complicated circumstances in which it is difficult to preliminarily presume all the environments, as in the case of the house-service robot, an issue arises in that the relationship between the output and the inner state becomes different from a preliminarily presumed environment, resulting in poor precision.

An object of the present invention is to resolve the above conventional issues, and to provide a control apparatus and a control method for an elastic body actuator, as well as a control program thereof, which can control a position or a force of a movable mechanism such as a robot arm driven by the elastic body actuator with high precision, even under an environment other than preliminarily presumed environments.

Means for Resolving the Issues

In order to solve the above conventional issues, the present invention has the following structures:

According to a first aspect of the present invention, there is provided a control apparatus for an elastic body actuator comprising:

an inner-state measuring unit that measures an inner state of the elastic body actuator;

an output measuring unit that measures an output of the elastic body actuator;

an output error compensation unit to which a desired value of the output of the elastic body actuator and a measured value of the output of the elastic body actuator measured by the output measuring unit are inputted so as to compensate for an output error;

a desired inner-state determination unit that determines a desired value of the inner state of the elastic body actuator based on the desired value of the output of the elastic body actuator;

an adjustable desired inner-state correction unit that, when an error occurs between the desired value of the output of the elastic body actuator and the measured value of the output of the elastic body actuator, determines a desired correcting value of the inner-state so as to make the error smaller; and an inner-state error compensation unit that allows an output from the output error compensation unit, a desired value for the inner-state outputted from the desired inner-state determination unit, a desired correcting value for the inner-state outputted from the adjustable desired inner-state correction unit, and an output from the inner-state measuring unit to be inputted therein so that an inner-state error is compensated, wherein based on the inner-state error that has been compensated for by the inner-state error compensation unit, the measured value of the output of the elastic body actuator is controlled to be set to the desired value of the output.

With this arrangement, it becomes possible to achieve control of an elastic body actuator that can control the position or force with high precision, even under an environment other than preliminarily presumed environments.

According to a thirteenth aspect of the present invention, there is provided a method for controlling an elastic body actuator, comprising:

measuring an inner state of the elastic body actuator with an inner-state measuring unit;

measuring an output of the elastic body actuator with an output measuring unit;

compensating an output error with an output error compensation unit by inputting a desired value of the output of the elastic body actuator and a measured value of the output of the elastic body actuator measured by the output measuring unit;

determining a desired value of the inner state of the elastic body actuator based on the desired value of the output of the elastic body actuator with a desired inner-state determination unit;

determining with an adjustable desired inner-state correction unit, when an error occurs between the desired value of the output of the elastic body actuator and the measured value of the output of the elastic body actuator, a desired correcting value of the inner state so as to make the error smaller; and compensating an inner-state error with an inner-state error compensation unit by inputting therein an output from the output error compensation unit, a desired value for the inner state outputted from the desired inner-state determination unit, a desired correcting value for the inner state outputted from the adjustable desired inner-state correction unit, and an output from the inner-state measuring unit, wherein the method comprising, based on the inner-state error that has been compensated for by the inner-state error compensation unit, controlling the measured value of the output of the elastic body actuator to be set to the desired value of the output.

With this arrangement, it becomes possible to achieve control of an elastic body actuator that can control the position or force with high precision, even under an environment other than preliminarily presumed environments.

According to a fourteenth aspect of the present invention, there is provided a program for a control apparatus for an elastic body actuator, allowing a computer to function as:

an output error compensation unit to which a desired value of the output of the elastic body actuator and a measured value of the output of the elastic body actuator measured by an output measuring unit that measures the measured value of the output of the elastic body actuator are inputted so as to compensate for an output error;

a desired inner-state determination unit that determines a desired value of an inner state of the elastic body actuator based on the desired value of the output of the elastic body actuator;

an adjustable desired inner-state correction unit that, when an error occurs between the desired value of the output of the elastic body actuator and the measured value of the output of the elastic body actuator, determines a desired correcting value of the inner state so as to make the error smaller; and an inner-state error compensation unit that allows an output from the output error compensation unit, a desired value for the inner-state outputted from the desired inner-state determination unit, a desired correcting value for the inner-state outputted from the adjustable desired inner-state correction unit, and an output from the inner-state measuring unit that measures the inner state of the elastic body actuator to be inputted therein so that an inner-state error is compensated, wherein based on the inner-state error that has been compensated for by the inner-state error compensation unit, the measured value of the output of the elastic body actuator is controlled to be set to the desired value of the output.

With this arrangement, it becomes possible to achieve control of an elastic body actuator that can control the position or force with high precision, even under an environment other than preliminarily presumed environments.

Effects of the Invention

According to a control apparatus and a control method for an elastic body actuator of the present invention, as well as a control program thereof, since the inner-state error compensation unit is installed to form a control system for feeding back the inner state of the elastic body actuator and since the desired inner-state determination unit and the adjustable desired inner-state correction unit are also installed to form a control system for feeding forward an adjustably corrected desired inner-state, it becomes possible to provide a high-speed controlling operation with high precision that is superior in response characteristic, with little stationary error.

BRIEF DESCRIPTION OF THE DRAWINGS

These and other objects and features of the present invention will become clear from the following description taken in conjunction with preferred embodiments thereof with reference to the accompanying drawings, in which:

FIG. 13 is a flow chart showing operation steps of a control program based on the elastic body actuator control apparatus according to the first embodiment of the present invention.

DESCRIPTION OF EMBODIMENTS

Figure 1:
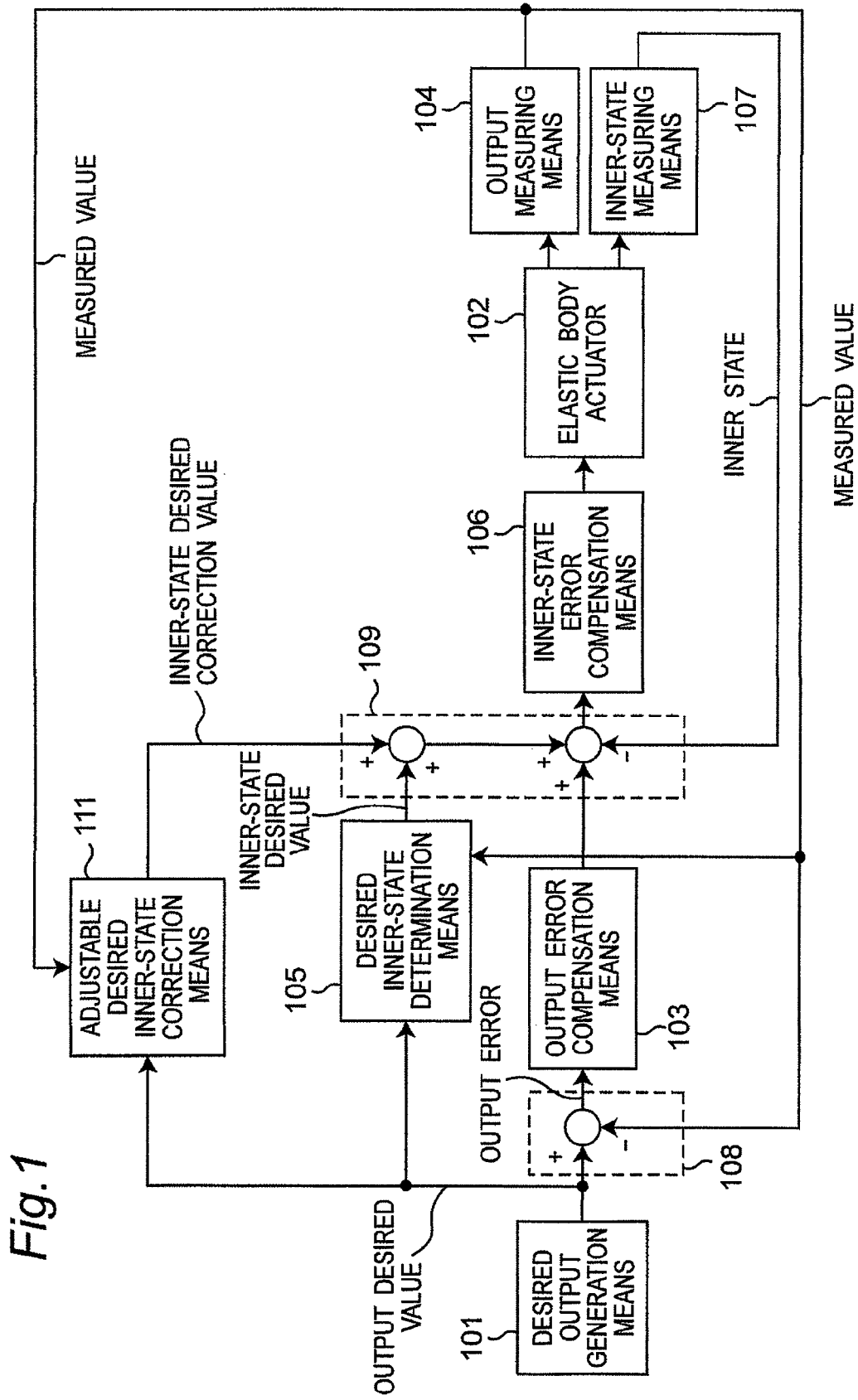
FIG. 1 is a block diagram showing a concept of a control apparatus for an elastic body actuator according to a first embodiment of the present invention.

With reference to the drawings, the following description will discuss embodiments of the present invention in detail.

Prior to describing the embodiments of the present invention, various modes of the present invention will be described.

According to a first aspect of the present invention, there is provided a control apparatus for an elastic body actuator comprising:

an inner-state measuring unit that measures an inner state of the elastic body actuator;

an output measuring unit that measures an output of the elastic body actuator;

an output error compensation unit to which a desired value of the output of the elastic body actuator and a measured value of the output of the elastic body actuator measured by the output measuring unit are inputted so as to compensate for an output error;

a desired inner-state determination unit that determines a desired value of the inner-state of the elastic body actuator based on the desired value of the output of the elastic body actuator;

an adjustable desired inner-state correction unit that, when an error occurs between the desired value of the output of the elastic body actuator and the measured value of the output of the elastic body actuator, determines a desired correcting value of the inner-state so as to make the error smaller; and an inner-state error compensation unit that allows an output from the output error compensation unit, a desired value for the inner-state outputted from the desired inner-state determination unit, a desired correcting value for the inner-state outputted from the adjustable desired inner-state correction unit, and an output from the inner-state measuring unit to be inputted therein so that the inner-state error is compensated, wherein based on the inner-state error that has been compensated for by the inner-state error compensation unit, the measured value of the output of the elastic body actuator is controlled to be set to the desired value of the output.

According to a second aspect of the present invention, there is provided the control apparatus for an elastic body actuator according to the first aspect, wherein the desired inner-state determination unit further acquires a measured value of an output of the elastic body actuator, and determines a desired value of the inner state of the elastic body actuator based on the desired value of the output of the elastic body actuator and the measured value of the output of the elastic body actuator.

According to a third aspect of the present invention, there is provided the control apparatus for an elastic body actuator according to the first or second aspect, further comprising:

an addition unit that adds the output of the desired inner-state determination unit to the output of the adjustable desired inner-state correction unit, and outputs the resulting value of the addition to the inner-state error compensation unit.

According to a fourth aspect of the present invention, there is provided the control apparatus for an elastic body actuator according to any one of the first to third aspects, wherein the adjustable desired inner-state correction unit calculates an adjusted offset value obtained by integrating a value obtained by multiplying a value prepared by subtracting an output value from the desired value of the output by a gain, and an adjusted gain value obtained by integrating a value obtained by multiplying a value obtained by multiplying a value prepared by subtracting an initial value from the desired value of the output by a value prepared by subtracting the output value from the desired value of the output, by a gain, so that a value obtained by adding a value prepared by multiplying the adjusted gain value by the desired value of the output to the adjusted offset value is set to a desired correcting value of the inner state.

According to a fifth aspect of the present invention, there is provided the control apparatus for an elastic body actuator according to any one of the first to fourth aspects, wherein the adjustable desired inner-state correction unit further comprises a reference model so that, when an error occurs among the output desired value, an output of the reference model and the output of the elastic body actuator, values, obtained by multiplying the desired value of the output and a state variable of the reference model by a gain that makes the error smaller, are added to each other so as to be set as a desired correcting value of the inner state.

According to a sixth aspect of the present invention, there is provided the control apparatus for an elastic body actuator according to any one of the first to fifth aspects, further comprising:

a correcting output control unit that carries out a switching operation among a state in which the adjustable desired inner-state correction unit is used, a state in which no adjustable desired inner-state correction unit is used, and a state in which an update of the output from the adjustable desired inner-state correction unit is stopped.

According to a seventh aspect of the present invention, there is provided the control apparatus for an elastic body actuator according to any one of the first to sixth aspects, further comprising:

a correcting output control unit that carries out a switching operation between a state that allows the output from the adjustable desired inner-state correction unit to pass through a low-pass filter and a state that does not allow the output to pass therethrough.

According to an eighth aspect of the present invention, there is provided the control apparatus for an elastic body actuator according to the sixth aspect, wherein the adjustable desired inner-state correction unit further comprises:

a determination unit that receives a repetition signal from the desired track generation unit by the adjustable desired inner-state correction unit, and when the determination unit has determined that tracks of the elastic body actuator, obtained when desired values of the elastic body actuator are time-sequentially aligned, are repetitive, determines to use the adjustable desired inner-state correction unit.

According to a ninth aspect of the present invention, there is provided the control apparatus for an elastic body actuator according to the eighth aspect, wherein upon using the adjustable desired inner-state correction unit, the correcting output control unit determines to stop updating the output of the adjustable desired inner-state correction unit, when the elastic body actuator has an output error that is smaller than a predetermined threshold value.

According to a tenth aspect of the present invention, there is provided the control apparatus for an elastic body actuator according to the sixth aspect, wherein the correcting output control unit comprises a collision detection unit that detects a fact that the elastic body actuator has collided with an object so that, upon detection of the collision by the collision detection unit, the correcting output control unit determines to stop updating the output of the adjustable desired inner-state correction unit.

According to an eleventh aspect of the present invention, there is provided the control apparatus for an elastic body actuator according to the sixth aspect, wherein the correcting output control unit determines not to use the adjustable desired inner-state correction unit when starting the elastic body actuator.

According to a twelfth aspect of the present invention, there is provided the control apparatus for an elastic body actuator according to the sixth aspect, wherein the correcting output control unit further comprises a low-pass filter that allows the output to pass therethrough for a predetermined period of time, when a state where the adjustable desired inner-state correction unit is not used is switched to a state where the adjustable desired inner-state correction unit is used, or when a state where the output of the adjustable desired inner-state correction unit is stopped without being updated is switched to a state where the output thereof is updated.

According to a thirteenth aspect of the present invention, there is provided a method for controlling an elastic body actuator, comprising:

measuring an inner state of the elastic body actuator with an inner-state measuring unit;

measuring an output of the elastic body actuator with an output measuring unit;

compensating an output error with an output error compensation unit by inputting a desired value of the output of the elastic body actuator and a measured value of the output of the elastic body actuator measured by the output measuring unit;

determining a desired value of the inner state of the elastic body actuator based on the desired value of the output of the elastic body actuator with a desired inner-state determination unit;

determining with an adjustable desired inner-state correction unit, when an error occurs between the desired value of the output of the elastic body actuator and the measured value of the output of the elastic body actuator, a desired correcting value of the inner state so as to make the error smaller; and compensating an inner-state error with an inner-state error compensation unit by inputting therein an output from the output error compensation unit, a desired value for the inner state outputted from the desired inner-state determination unit, a desired correcting value for the inner state outputted from the adjustable desired inner-state correction unit, and an output from the inner-state measuring unit, wherein the method comprising, based on the inner-state error that has been compensated for by the inner-state error compensation unit, controlling the measured value of the output of the elastic body actuator to be set to the desired value of the output.

According to a fourteenth aspect of the present invention, there is provided a program for a control apparatus for an elastic body actuator, allowing a computer to function as:

an output error compensation unit to which a desired value of an output of the elastic body actuator and a measured value of the output of the elastic body actuator measured by an output measuring unit that measures the measured value of the output of the elastic body actuator are inputted so as to compensate for an output error;

a desired inner-state determination unit that determines a desired value of the inner state of the elastic body actuator based on the desired value of the output of the elastic body actuator;

an adjustable desired inner-state correction unit that, when an error occurs between the desired value of the output of the elastic body actuator and the measured value of the output of the elastic body actuator, determines a desired correcting value of the inner state so as to make the error smaller; and an inner-state error compensation unit that allows an output from the output error compensation unit, a desired value for the inner state outputted from the desired inner-state determination unit, a desired correcting value for the inner state outputted from the adjustable desired inner-state correction unit, and an output from inner-state measuring unit that measures the inner state of the elastic body actuator to be inputted therein so that an inner-state error is compensated, wherein based on the inner-state error that has been compensated for by the inner-state error compensation unit, the measured value of the output of the elastic body actuator is controlled to be set to the desired value of the output.

With reference to the drawings, the following description will discuss embodiments of the present invention in detail.

(First Embodiment)

FIG. 1 is a block diagram showing a concept of a control apparatus for an elastic body actuator according to a first embodiment of the present invention. In FIG. 1, an elastic body actuator 102 is a fluid-pressure drive actuator that is driven by a fluid pressure.

The control apparatus for the elastic body actuator 102 is provided with a desired output generation means 101, an output measuring means 104, a desired inner-state determination means 105, an output error compensation means 103, an adjustable desired inner-state correction means 111, an inner-state measuring means 107, an inner-state error compensation means 106, and an output error calculation unit 108.

The desired output generation means 101 generates a desired value 113 of an output from each of the elastic body actuators 102.

The output measuring means 104, which is connected to the respective elastic body actuators 102, measures the output of each elastic body actuator 102, and inputs a measured value 112 to the output error compensation means 103 and the adjustable desired inner-state correction means 111 respectively, through the desired inner-state determination means 105 and the output error calculation unit 108.

The output error calculation unit 108 calculates an output error 114 based on the output desired value 113 from the desired output generation means 101 and the output (calculated value 112) from the output measuring means 104, and outputs the calculated result to the output error compensation means 103.

The output error compensation means 103 corrects the output error 114 inputted from the output error calculation unit 108 to the output error compensation means 103 so as to be made smaller, and controls the measured value 112 measured by the output measuring means 104 so as to follow the output desired value 113 from the desired output generation means 101.

The desired inner-state determination means 105 to which the output desired value 113 of the desired output generation means 101 and the measured value 112 from the output measuring means 104 have been inputted determines an inner-state desired value 116 of each of the elastic body actuators 102 based on the output desired value 113 and the measured value 112.

The adjustable desired inner-state correction means 111 to which the output desired value 113 from the desired output generation means 101 and the measured value 112 from the output measuring means 104 have been inputted carries out a signal processing operation by using an adjustable algorithm based on the output desired value 113 and the measured value 112, and determines an inner-state desired correcting value 117 of each of the elastic body actuators 102. More specifically, based on the desired value of the output of each of the elastic body actuators 102 and the measured value of the output of each of the elastic body actuators 102, when an error is generated between the inner state of the elastic body actuator 102 and the output of the elastic body actuator 102, the adjustable desired inner-state correction means 111 carries out a signal combining operation so as to make the error smaller so that the resulting signal is determined as the desired correcting value 117 of the inner state. An inner-state error calculation unit 109, which serves as one example of an addition unit, calculates an inner-state error based on an output 115 from the output error compensation means 103, the output (inner-state desired value) 116 from the desired inner-state determination means 105, the output (inner-state desired correcting value) 117 from the adjustable desired inner-state correction means 111, and an output (inner-state measured value) 118 from the inner-state measuring means 107, and outputs the resulting value to the inner-state error compensation means 106.

Upon receipt of the output from the output error compensation means 103, the output from the desired inner-state determination means 105, the output from the adjustable desired inner-state correction means 111, and the output from the inner-state error calculation unit 109, the inner-state error compensation means 106 carries out a controlling operation so as to compensate for the inner-state error, that is, so as to allow the inner-state measured value of each of the elastic body actuators 102 to follow the desired value.

The inner-state measuring means 107, which is connected to each of the elastic body actuators 102, measures an inner-state measured value 118 that corresponds to an inner pressure of each of elastic expansion/contraction structural members 1, which will be described later, in each of the elastic body actuators 102, and inputs the measured value to the inner-state error calculation unit 109.

With reference to a flow chart of FIG. 13, the following description will discuss actual operation steps of a control program formed based on the above-mentioned principle.

In step S101, the measured value of the output of each elastic body actuator 102, measured by the output measuring means 104, is received by the control apparatus.

Next, in step S102, based on an operation program of each elastic body actuator 102, preliminarily stored in the desired output generation means 101, the desired output generation means 101 calculates an output desired value of the elastic body actuator 102.

Next, in step S103, the output error calculation unit 108 calculates an output error that is a difference between the output desired value calculated by the desired output generation means 101 and the measured value of the current output measured by the output measuring means 104.

Next, in step S104, the output error compensation means 103 calculates an output error correction output from the output error calculated by the output error calculation unit 108.

Next, in step S105, based on the output desired value calculated in the desired output generation means 101 and the measured value of the current output measured by the output measuring means 104, the desired inner-state determination means 105 calculates an inner-state desired value.

Next, in step S106, based on the output desired value calculated in the desired output generation means 101 and the measured value of the current output measured by the output measuring means 104, the adjustable desired inner-state correction means 111 calculates an adjustable desired inner-state correction value.

Next, in step S107, the measured value of the inner state of the elastic body actuator 102, measured by the inner-state measuring means 107, is received by the control apparatus.

Next, in step S108, by subtracting the measured value of the inner state measured in step S107 from a value obtained by adding the output error correction output calculated by the output error compensation means 103 in step S104, the inner-state desired value calculated by the desired inner-state determination means 105 in step S105, and the adjustable desired inner-state correcting value calculated in the adjustable desired inner-state correction means 111 in step S106 to one another, the inner-state error calculation unit 109 calculates an inner-state error.

Next, in step S109, based on the inner-state error calculated by the inner-state error calculation unit 109, the inner-state error compensation means 106 calculates an inner-state error correction output.

Next, in step S110, the inner-state error correction output calculated by the inner-state error compensation means 106 is given from the inner-state error compensation means 106 to the elastic body actuator 102 so that elastic body actuator 102 is driven.

By repeatedly executing the above steps S101 to S110 as a controlling calculation loop, the control of the elastic body actuator 102 is realized.

Next, the following description will discuss a specific example of the control apparatus of the elastic body actuator 102 of the first embodiment, by exemplifying a robot arm 10 as a control subject.

Figure 2:
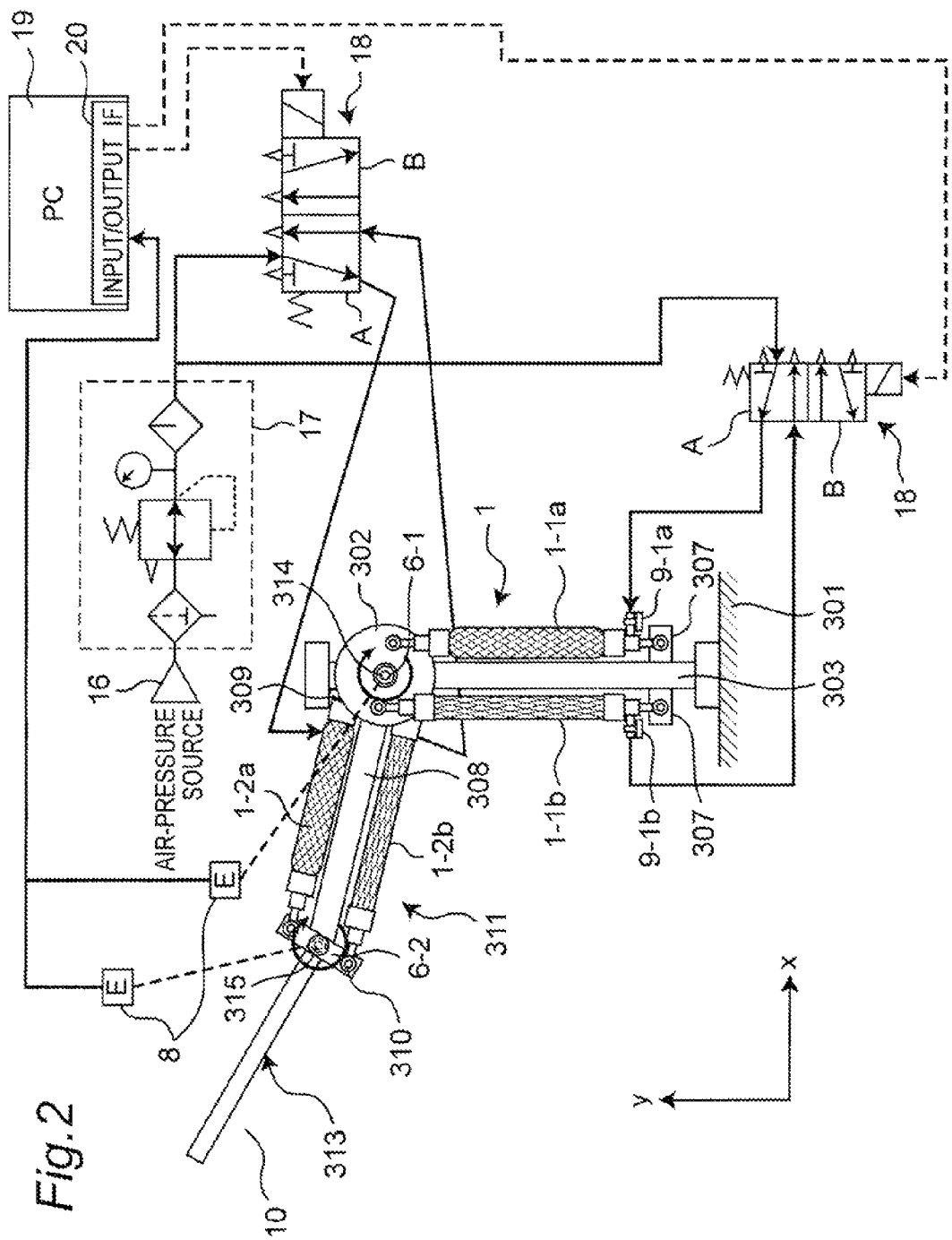
FIG. 2 is a view showing a structure of a robot arm that is a subject to be controlled by the control apparatus for the elastic body actuator according to the first embodiment of the present invention.

FIG. 2 is a view showing a structure of the robot arm 10 serving as the subject to be controlled by the control apparatus of the elastic body actuator 102 according to the first embodiment of the present invention. The robot arm 10 is a robot arm of two degrees of freedom, and provided with a first joint axis 6-1 that is allowed to forwardly and reversely rotate on an xy plane including an x-axis and a y-axis that are orthogonal to each other and a second joint axis 6-2 that is allowed to forwardly and reversely rotate on the xy plane in the same manner.

Figure 3:
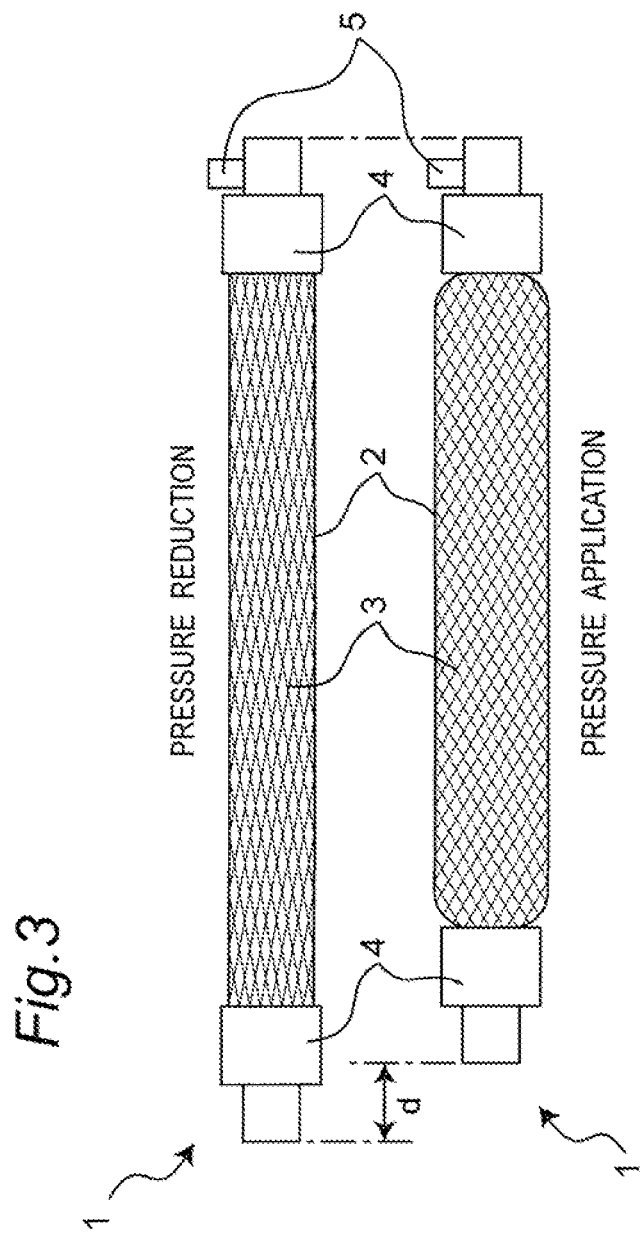
FIG. 3 is a view showing a structure and operations of an elastic expansion/contraction structural member for driving the robot arm to be controlled by the control apparatus for the elastic body actuator according to the first embodiment of the present invention.

In FIG. 2, reference numerals, 1-1*a*, 1-1*b*, 1-2*a*, and 1-2*b* (which are reference numerals indicating elastic expansion/contraction structural members individually, and when the elastic expansion/contraction structural member is typically represented, reference numeral 1 is used), represent elastic expansion/contraction structural members. As shown in FIG. 3, the elastic expansion/contraction structural member 1 has a structure in which a deforming direction regulating member 3, made of fiber codes of resin or metal that are hardly extendable material and knitted into a network pattern, is disposed on an outer surface of a tube-shaped hollow elastic member 2 composed of a rubber material and functions as a driving unit. The deforming direction regulating member 3 is designed so that a deformation in a radial direction by an expansion of the tube-shaped elastic member 2 is converted to a contraction in length in the axial direction, while a deformation in a radial direction by a contraction of the tube-shaped elastic member 2 is converted to an expansion in length in the axial direction. Each of the two ends of the tube-shaped elastic member 2 is air-tightly sealed by a sealing member 4. A tube-shaped fluid transmitting member 5 provided in the sealing member 4 has a flow passage for fluid through which a compressible fluid is allowed to pass, formed therein, so that a fluid can be injected or discharged to or from the hollow inner space of the hollow elastic member 2. A compressible fluid, such as air, is supplied to the hollow tube-shaped elastic member 2 through the fluid transmitting member 5.

When an inner pressure is applied to the inner space of the tube-shaped elastic member 2 by the compressible fluid supplied thereto, the tube-shaped elastic member 2 tends to expand mainly in the radial direction. However, by the function of the deforming direction regulating member 3, the movement is converted into motion in the center axis direction of the tube-shaped elastic member 2 so that, since the overall length is contracted, it can be utilized as a direct-driven elastic body actuator 102.

In the robot arm 10, a pair of elastic expansion/contraction structural members (1, 1) is disposed so as to allow the joint axis 6-1 or 6-2 to face its fulcrum. Of the paired elastic expansion/contraction structural members (1, 1), either one of the elastic expansion/contraction structural members 1 is contracted, with the other elastic expansion/contraction structural member 1 is expanded. Thus, a competitive driving structure in which forces are exerted through the fulcrum to rotate the axis is formed so that forward and reverse rotation movements of the joint axis 6-1 or 6-2 are realized. More specifically, by the competitive driving operations of the elastic expansion/contraction structural member 1-1*a* and the elastic expansion/contraction structural member 1-1*b*, the first joint axis 6-1 is allowed to forwardly and reversely rotate. By the competitive driving operations of the elastic expansion/contraction structural member 1-2*a* and the elastic expansion/contraction structural member 1-2*b*, the second joint axis 6-2 is allowed to forwardly and reversely rotate.

Two round supporting members 302, 302 are supported on two sides of an upper end of a supporting axis (second axis) 303 concentrically with the first joint axis 6-1 so as to freely rotate thereon. On a fixed base 301 side of the lower end of the supporting axis 303, supporting members 307, 307 are secured in a direction orthogonal to the longitudinal direction of the supporting axis 303. The elastic expansion/contraction structural members 1-1*a* and 1-1*b* are coupled to each other between the two round supporting members 302, 302 and the supporting members 307, 307. Consequently, by the competitive driving operations of the elastic expansion/contraction structural members 1-1*a* and 1-1*b*, the two round supporting members 302, 302 are allowed to forwardly and reversely rotate within the xy plane around the axis of the supporting axis 314 of the first joint axis 6-1. As a result, a first arm 311 of the robot arm 10 coupled to the two round supporting members 302, 302 and a driving axis 313 can be forwardly and reversely rotated integrally.

A first arm link (first axis) 308 of the first arm 311 has its one end secured to the two round supporting members 302, 302, and is designed to be integrally rotated with the two round supporting members 302, 302. On the round supporting member 302 side of the first arm link 308, supporting members 309, 309 (see FIG. 4) that are the same as the supporting members 307, 307 are secured in a direction orthogonal to the longitudinal direction of the first arm link 308.

Moreover, onto the tip side of the first arm link 308, a supporting member 310, secured to the first arm link 311 in a direction orthogonal to the longitudinal direction thereof is coupled so as to rotate around the axis center of the second joint axis 6-2. Between the supporting member (not shown) on the round supporting member 302 side of the first arm link 308 and the supporting member 310 on the tip side, elastic expansion/contraction structural members 1-2*a* and 1-2*b* are coupled to each other. Consequently, by the competitive driving operations of the elastic expansion/contraction structural members 1-2*a* and 1-2*b*, the driving axis 313 of the robot arm 10 can be forwardly and reversely rotated relative to each other within the xy plane around the supporting axis 315 of the second joint axis 6-2.

Pressure sensors 9-1*a*, 9-1*b*, which are examples of the inner-state measuring means 107 that measures respective inner states (for example, inner pressures) of the elastic expansion/contraction structural members (1-1*a*, 1-1*b*), are disposed on respective fluid transmitting members 5 (fluid injection cutlets) so as to measure the inner pressures of the respective elastic expansion/contraction structural members (1-1*a*, 1-1*b*). In the same manner, pressure sensors 9-2*a*, 9-2*b* (not shown), which are examples of the inner-state measuring means 107, are also disposed on the respective elastic expansion/contraction structural members (1-2*a*, 1-2*b*).

To each of the elastic expansion/contraction structural members 1-1*a*, 1-1*b* and elastic expansion/contraction structural members 1-2*a*, 1-2*b*, as will be described later, a flow-rate proportional electromagnetic valve 18 is connected, and all the flow-rate proportional electromagnetic valves 18 are connected to a control computer 19 constituted by a general-use personal computer serving as one example of a control unit. The control computer 19 controls contraction and expansion operations of the elastic expansion/contraction structural members 1-1*a*, 1-1*b* and elastic expansion/contraction structural members 1-2*a*, 1-2*b*, by using the flow-rate proportional electromagnetic valves 18. Moreover, displacement measuring means (in the present embodiment, an encoder 8 serving as one example of a displacement measuring means) serving as one example of output measuring means 104 is disposed on each of the joint axes 6-1 and 6-2 so that the joint angles of the respective joint axes 6-1 and 6-2 can be measured by the respective encoders 8. Pressure measuring means (in the present embodiment, a pressure sensor 9 serving as one example of the pressure measuring means) serving as one example of the inner-state measuring means 107 is disposed in each of the elastic expansion/contraction structural members 1 so that the inner pressure of each of the elastic expansion/contraction structural members 1 can be measured by the pressure sensor 9.

In the case where, with the above-mentioned structure, for example, a hand capable of grabbing an object is attached in place of the driving axis 313, by utilizing multiple degrees of freedom, it is possible to realize basic functions as the robot arm 10, such as grabbing and transporting operations of an object. The position and posture of this hand will be described below as the hand position and posture thereof.

Figure 4:
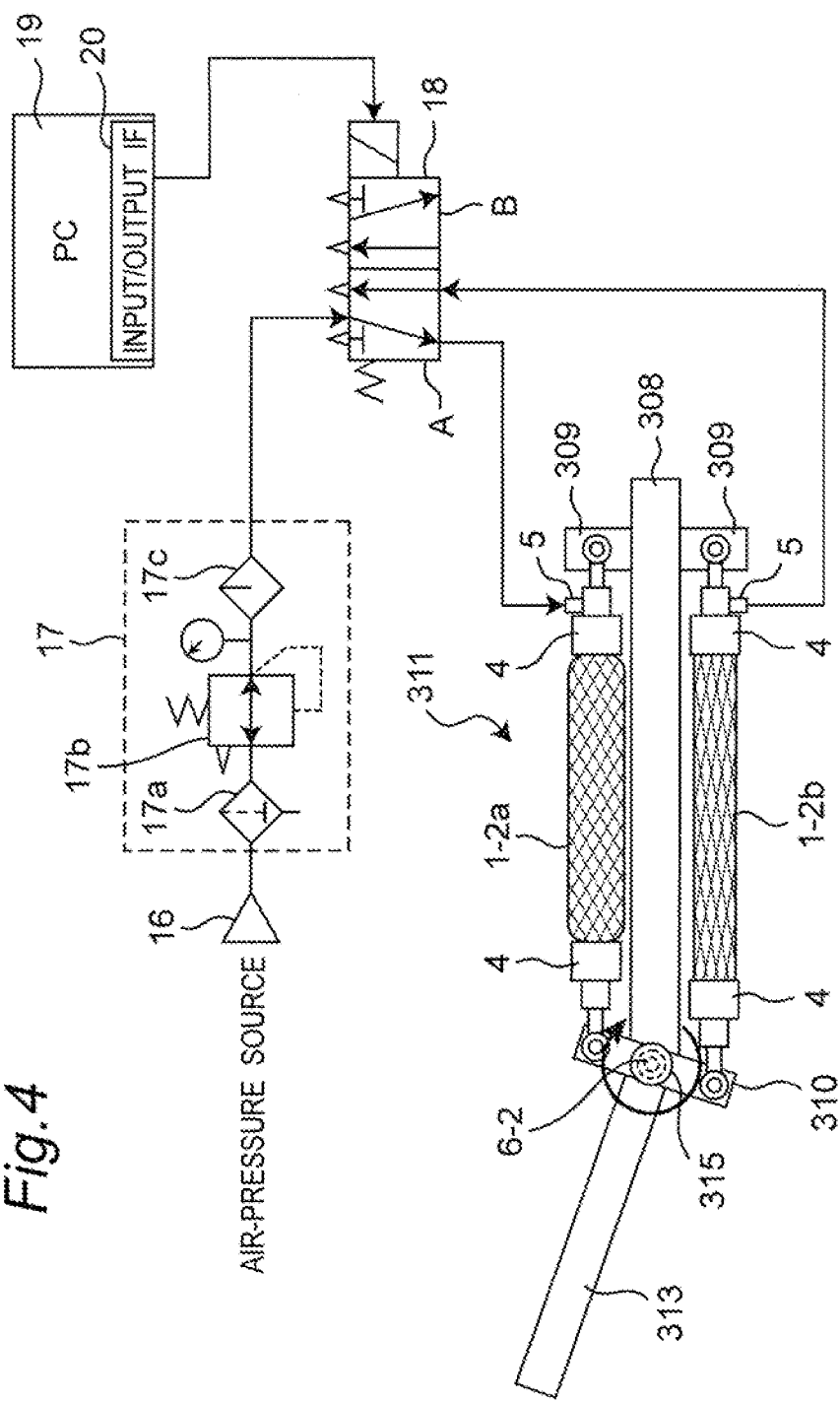
FIG. 4 is a view showing operations of an air pressure supply system for driving the robot arm to be controlled by the control apparatus for the elastic body actuator according to the first embodiment of the present invention by using air serving as a compressive fluid.

FIG. 4 is a view showing a structure of a pneumatic pressure supply system for use in driving the robot arm 10 according to the first embodiment of the present invention. In FIG. 4, only a portion that drives the second joint axis 6-2 of the robot arm 10 to forwardly and reversely rotate is shown, with the other portions being omitted. In FIG. 4, reference numeral 16 represents an air pressure source, such as a compressor, and reference numeral 17 represents a pneumatic adjusting unit having a set of a pneumatic filter 17a, a pneumatic pressure-reducing valve 17b, and a pneumatic lubricator 17c. Reference numeral 18 represents a flow-rate control electromagnetic valve with 5 ports, serving as one example of a flow-rate proportional electromagnetic valve that controls the flow rate by driving a spool valve and the like by using, for example, a force of an electromagnet. The control computer 19, provided with an input/output IF 20 such as a D/A board, is allowed to independently control the flow rate of each portion of air flowing through each of the fluid transmitting members 5, by outputting a voltage instruction value to the flow-rate control electromagnetic valve 18 with 5 ports.

The following description will discuss operations of an air-pressure supply system shown in FIG. 4. High-pressure air, generated by the air-pressure source 16, is pressure-reduced by an air-pressure adjusting unit 17 to be adjusted to a constant pressure, such as, for example, 600 [kPa], and supplied to the flow-rate control electromagnetic valve 18 with 5 ports. The opening degree of the flow-rate control electromagnetic valve 18 with 5 ports is controlled in proportion to a voltage instruction value outputted from the control computer 19 through the input/output IF 20. In the case where a positive voltage instruction value is inputted to the flow-rate control electromagnetic valve 18 with 5 ports from the control computer 19, a state as shown by an air-pressure circuit symbol A is generated in which a flow passage is opened from the air-pressure source 16 side to the elastic expansion/contraction structural member 1-2a side so that an air flow having a flow rate in proportion to the absolute value of the voltage instruction value is supplied to the elastic expansion/contraction structural member 1-2a side. Moreover, on the elastic expansion/contraction structural member 1-2b side, a flow passage toward the atmospheric pressure side is opened so that an air flow having a flow rate in proportion to the absolute value of the voltage instruction value is discharged into the atmosphere from the elastic expansion/contraction structural member 1-2b side. Therefore, as shown in FIG. 4, the overall length of the elastic expansion/contraction structural member 1-2a is contracted, while the overall length of the elastic expansion/contraction structural member 1-2b is expanded, so that the second joint axis 6-2 is allowed to make a clockwise rotational motion at a speed in proportion to the absolute value of the voltage instruction value. On the other hand, in the case where a negative voltage instruction value is inputted to the flow-rate control electromagnetic valve 18 with 5 ports from the control computer 19, a state as shown by an air-pressure circuit symbol B is generated in which the operations of the elastic expansion/contraction structural members 1-2a and 1-2b are reversed to each other (that is, the overall length of the elastic expansion/contraction structural member 1-2a is expanded, while the overall length of the elastic expansion/contraction structural member 1-2b is contracted) so that the second joint axis 6-2 is allowed to make a counterclockwise rotational motion.

That is, an air flow, supplied from the flow-rate control electromagnetic valve 18 with 5 ports toward the elastic expansion/contraction structural member 1 side, is allowed to pass through the sealing member 4 by the fluid transmitting member 5 and reach the inside of the tube-shaped elastic member 2 so that an inner pressure of the tube-shaped elastic member 2 is generated. The tube-shaped elastic member 2 is expanded by the inner pressure thus generated; however, by the constraining function (regulating function) of the fiber cords knitted into a network pattern of the deforming direction regulating member 3, the deformation in the radial direction due to expansion is regulated and converted to a contraction in length in the axial direction so that, as shown on the lower side of FIG. 3, the overall length of the elastic expansion/contraction structural member 1 is shortened. In contrast, by discharging air from the flow-rate control electromagnetic valve 18 with 5 ports into the atmosphere to reduce the inner pressure of the tube-shaped elastic member 2, the shape of the tube-shaped elastic member 2 is restored by its elastic force so that the expansion is released, thereby allowing the overall length of the elastic expansion/contraction structural member 1 to extend as shown on the upper side of FIG. 3. As a result, supposing that the right end is secured in FIG. 3, the above-mentioned expansion and contraction cause a difference d in distance on the left end of the tube-shaped elastic member 2. Therefore, by supply-controlling the air pressure, the elastic expansion/contraction structural member 1 of the first embodiment is allowed to function as a direct-driven displacement actuator. Since the expanding and shortening amounts are substantially in proportion to the inner pressure of the elastic expansion/contraction structural member 1, the overall length of the elastic expansion/contraction structural member 1 can be controlled by adjusting the flow rate of air to be supplied to the elastic expansion/contraction structural member 1, by controlling the flow-rate control electromagnetic valve 18 with 5 ports by using the control computer 19 as shown in FIG. 4.

In the robot arm 10 shown in FIG. 2, to provide the competitive driving operations by the elastic expansion/contraction structural members 1-1a and 1-1b as well as the competitive driving operations by the elastic expansion/contraction structural members 1-2a and 1-2b, the flow-rate control electromagnetic valve 18 with 5 ports is installed in each of the competitive elastic expansion/contraction structural members 1 so as to form the same air-pressure supply system. By a voltage instruction value to be outputted to each of the flow-rate control electromagnetic valves 18 with 5 ports through the D/A board 20 by the control computer 19, all the joint axes 6-1, 6-2 of the robot arm 10 can be forwardly and reversely driven to rotate simultaneously.

Figure 5:
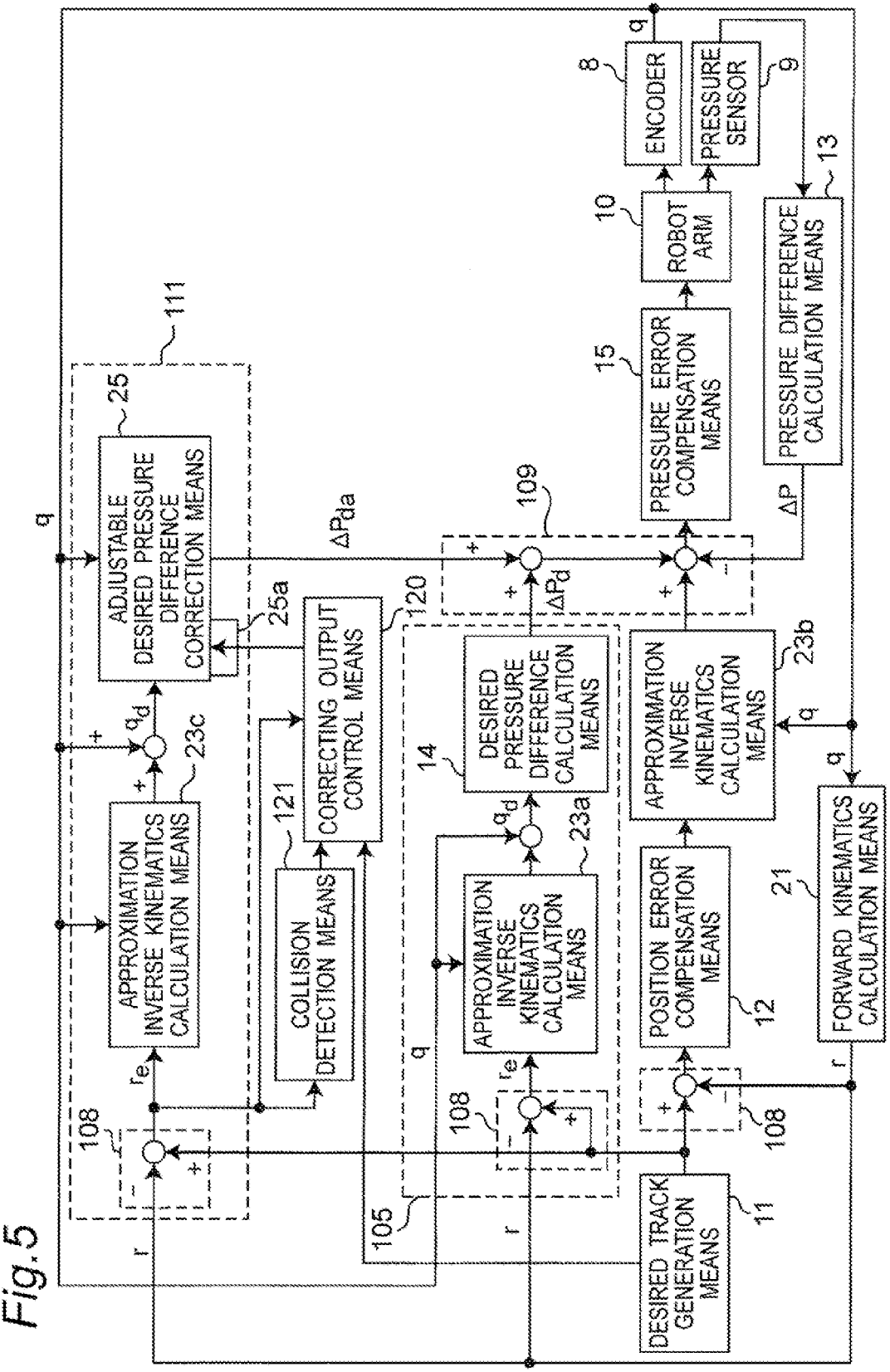
FIG. 5 is a control block diagram of the control apparatus for the elastic body actuator according to the first embodiment of the present invention.

FIG. 5 is a view showing a more specific structure of a control apparatus for the elastic body actuator 102 according to the first embodiment of the present invention, and the control apparatus is installed, for example, in the control computer 19. In FIG. 5, reference numeral 10 represents a robot arm shown in FIG. 2, which is a subject to be controlled by the control apparatus of the elastic body actuator 102. From the robot arm 10, a current value (joint angle vector)

$q=[q_1, q_2]^T$ of a joint angle serving as one example of a measured value 112, measured by each of the encoders 8 of the joint axes 6-1 and 6-2, and an inner pressure $P=[P_{1a}, P_{1b}, P_{2a}, P_{2b}]^T$ of the elastic expansion/contraction structural member 1 serving as one example of an inner-state measured value 118 measured by the pressure sensor 9 of the elastic expansion/contraction structural member 1 are outputted. In this case, $q_1$ and $q_2$ respectively correspond to joint angles of the first joint axis 6-1 and the second joint axis 6-2. Moreover, $P_{1a}$, $P_{1b}$, $P_{2a}$, and $P_{2b}$ respectively correspond to inner pressures of the elastic expansion/contraction structural members 1-1a, 1-1b, 1-2a, and 1-2b.

To pressure-difference calculation means 13, an inner pressure P (measured value P) measured by the pressure sensor 9 is inputted, and a pressure difference $\Delta P=[\Delta_{P1}, \Delta_{P2}]^T=[P_{1a}-P_{1b}, P_{2a}-P_{2b}]^T$ is calculated from the measured value P of the pressure sensor 9 by the pressure-difference calculation means 13, and the resulting value is outputted to the inner-state error calculation unit 109.

A joint angle vector a corresponding to the current value q of the joint angle measured by the encoder 8 of each of the joint axes 6-1 and 6-2 is inputted from the encoder 8 to forward kinematics calculation means 21 where geometrical calculations for converting the joint angle vector q to the hand position and posture vector r of the robot arm 10 are executed.

Each of approximation inverse kinematics calculation means (23a, 23b, 23c) carries out approximation calculations of inverse kinematics by using an approximation equation $u_{out}=J_r(q)^{-1}u_{1n}$. In this case, $J_r(q)$ is a Jacob matrix, $u_{1n}$ is an input given to each of the approximation inverse kinematics calculation means 23a, 23b, 23c, and $u_{out}$ is an output from each of the approximation inverse kinematics calculation means 23a, 23b, 23c, and supposing that the input $u_{1n}$ is set to a hand position and posture error $r_e$, with the output $u_{out}$ being set to joint angle error $q_e$, a conversion equation from the hand position and posture error $r_e$ to the joint angle error $q_e$, as represented by $q_e=J_r(q)^{-1}r_e$, is obtained. According to these approximation inverse kinematics calculation means 23a, 23b, and 23c, it becomes possible to easily carry out approximation inverse kinematics calculations.

To the approximation inverse kinematics calculation means 23a, the current value q of the joint angle vector measured in the robot arm 10 and the hand position and posture error $r_e$ between a hand position and posture desired vector $r_d$ that is outputted from desired track generation means 11 serving as one example of the desired output generation means 101 as one example of the output desired value 113 and a current hand position and posture vector r are inputted, and an error $q_e$ of the joint angle vector is outputted therefrom.

To the approximation inverse kinematics calculation means 23b, the current value q of the joint angle vector measured in the robot arm 10 and a position error correction output $\Delta P_{re}$ from a position error compensation means 12 are inputted, and a joint error correction output $\Delta P_{qe}$ is outputted therefrom.

To the approximation inverse kinematics calculation means 23c, the current value q of the joint angle vector measured in the robot arm 10 and an error $r_e$ between the hand position and posture desired vector $r_d$ that is outputted from the desired track generation means 11 and the current hand position and posture vector r are inputted, and an error $q_e$ of the joint angle vector is outputted therefrom.

The desired track generation means 11 outputs the hand position and posture desired vectors $r_d$ used for achieving desired operations of the robot arm 10. With respect to the desired operations of the robot arm 10, flags relating to positions ($r_{d0}, r_{d1}, r_{d2}, \ldots$) at respective points of time ($t=0, t=t_1, t=t_2, \ldots$) and indicating whether or not repetitive operations are required are preliminarily recorded depending on each of desired jobs, and the desired track generation means 11 utilizes polynomial interpolation based on information of the positions ($r_{d0}, r_{d1}, r_{d2}, \ldots$) and hand position and posture vector r at respective points of time ($t=0, t=t_1, t=t_2, \ldots$) to interpolate the track between the respective points so that a hand position and posture desired vector $r_d$ is generated.

To the output error calculation unit 108, the hand position and posture desired vector $r_d$ and the hand position and posture vector r calculated by the forward kinematics calculation means 21 are inputted, and a hand position and posture error $r_e=r-r_d$ is calculated so that the resulting hand position and posture error $r_e$ is outputted as one example of the output error 114.

To the position error compensation means 12 serving as one example of the output error compensation means 103, the hand position and posture error $r_e$ outputted by the output error calculation unit 108 is inputted, and a position error correction output $\Delta P_{re}$ serving as one example of the output 115 is released therefrom toward the approximation inverse kinematics calculation means 23b.

The desired inner-state determination means 105 is constituted by, for example, the output error calculation unit 108, desired pressure difference calculation means 14, and the approximation inverse kinematics calculation means 23a. To the desired pressure difference calculation means 14, an equation $q_d=q+J_r(q)^{-1}r_e$ serving as the desired joint angle vector $q_d$, obtained based on the current value q of the joint angle vector measured in the robot arm 10 and the joint angle vector error $q_e$, is inputted, and a desired pressure difference (desired value for a pressure difference) $\Delta P_d=[\Delta P_{1d}, \Delta P_{2d}]^T$ is calculated from the desired joint angle vector $q_d$ as one example of the inner-state desired value 116, and the resulting value is outputted toward the desired inner-state error calculation unit 109. In this case, $\Delta P_{1d}$ and $\Delta P_{2d}$ respectively correspond to desired values of pressure differences between the elastic expansion/contraction structural members 1-1a, 1-1b and the elastic expansion/contraction structural members 1-2a, 1-2b.

The adjustable desired inner-state correction means 111 is constituted by, for example, the output error calculation unit 108, adjustable desired pressure difference correction means 25, and the approximation inverse kinematics calculation means 23c. To the adjustable desired pressure difference correction means 25, the equation $q_d=q+J_r(q)^{-1}r_e$ serving as the desired joint angle vector $q_d$, obtained based on the current value q of the joint angle vector measured in the robot arm 10 and the joint angle vector error $q_e$, and the joint angle vector q are inputted, and the adjustable desired pressure difference correction means 25 calculates an adjusted correcting value of the desired pressure difference (one example of the inner-state desired correcting value 117), $\Delta P_{da}=[\Delta P_{1da}, \Delta P_{2da}]^T$, and the calculated adjusted correcting value $\Delta P_{da}$ is outputted to the inner-state error calculation unit 109 from the adjustable desired pressure difference correction means 25. In this case, the $\Delta P_{1da}$ and $\Delta P_{2da}$ respectively correspond to adjusted correcting values of the desired values (desired pressure differences) of pressure differences between the elastic expansion/contraction structural members 1-1a and 1-1b, as well as between the elastic expansion/contraction structural members 1-2a and 1-2b.

In response to a signal for starting an operation and a repetitive signal for a desired track, inputted from the desired track generation means 11, as well as to a collision detection signal inputted from collision detection means 121, which will be described later, and an output error inputted from the output error calculation unit 108, correcting output control means 120 outputs an ON or OFF instruction of the adjustable desired pressure difference correction means 25 (instruction for an ON mode, or instruction for an OFF mode), or a holding instruction for an output value (instruction for a holding (update-stopping) mode), or an ON or OFF instruction for a low-pass filter, to the adjustable desired pressure difference correction means 25. The low-pass filter is prepared as, for example, software, installed in the adjustable desired pressure difference correction means 25. Upon switching from the OFF mode to ON mode on the adjustable desired pressure difference correction means 25, or upon switching from the holding (update-stopping) mode to the ON mode thereon, the desired pressure difference, i.e., the output from the adjustable desired pressure difference correction means 25 changes drastically to make the operations of the robot arm 10 unstable; therefore, the low-pass filter is used for preventing the unstable state. Upon switching the above-mentioned modes, the output from the adjustable desired pressure difference correction means 25 is outputted after having been allowed to pass through the low-pass filter; thus, it is possible to change the desired pressure difference slowly.

The inner-state error calculation unit 109 adds the adjusted correcting value $\Delta P_{da}$ for the desired pressure difference outputted from the adjustable desired pressure difference correction means 25, the value $\Delta P_d$ outputted from the desired inner-state determination means 105, and the value $\Delta P_{qe}$ outputted from the approximation inverse kinematics calculation means 23b to one another, and subtracts the value $\Delta P$ outputted from the pressure difference calculation means 13 from the added value so that the calculated pressure difference error (pressure error value) $\Delta P_e$ is outputted to a pressure difference error compensation means 15.

The pressure difference error compensation means serving as one example of the inner-state error correction means 106 receives the pressure difference error $\Delta P_e$ from the inner-state error calculation unit 109 so that a pressure difference error correction output u is outputted toward the robot arm 10. The pressure difference error correction output u is given to the flow-rate control electromagnetic valve 18 with 5 ports, through the input/output IF 20 such as a D/A board, as a voltage instruction value, and the respective joint axes 6-1 and 6-2 are forwardly and reversely driven to rotate so that the robot arm 10 is operated.

The collision detection means 121 detects the fact that the robot arm 10 has collided with an external object, and outputs a collision detection signal to the correcting output control means 120. As one example for collision detection, FIG. 5 shows a structure in which the error of the hand position of the robot arm 10 is utilized. In this method, the error of the hand position is differentiated, and in the case where the time-based differentiated value of the error becomes greater than a preliminarily determined threshold value, it is assumed that a collision has occurred. In addition, the collision detection method may include a method using a camera for detection, or a method in which a contact sensor or a force sensor is used for detection.

With respect to the control apparatus having the above structure, the following description will discuss the principle of control operations.

The control operations basically relate to a feedback control (positional control) operation of the hand position and posture error $r_e$ by the use of the position error compensation means 12. For example, by using a PID compensator as the position error compensation means 12, controlling operations are exerted so as to converge the hand position and posture error $r_e$ to zero, thereby making it possible to realize a desired operation of the robot arm 10.

Since the pressure difference error $\Delta P_e$ is inputted to the pressure difference error compensation means 15, the pressure difference error compensation means 15 is operated when the hand position and posture error $r_e$ is generated so that the control for pressure difference is exerted so as to converge the hand position and posture error $r_e$ to zero. In the elastic expansion/contraction structural member 1 shown in FIG. 3, a displacement is not generated until a change in the inner pressure has occurred; therefore, the pressure change is observed earlier on a time basis than the positional change (displacement). Therefore, by providing an inner-pressure feedback loop for controlling the pressure difference inside a positional feedback loop for controlling the position, as indicated by the control system shown in FIG. 5, it becomes possible to compensate for poor response characteristic and also to improve the position controlling performance.

Figure 6:
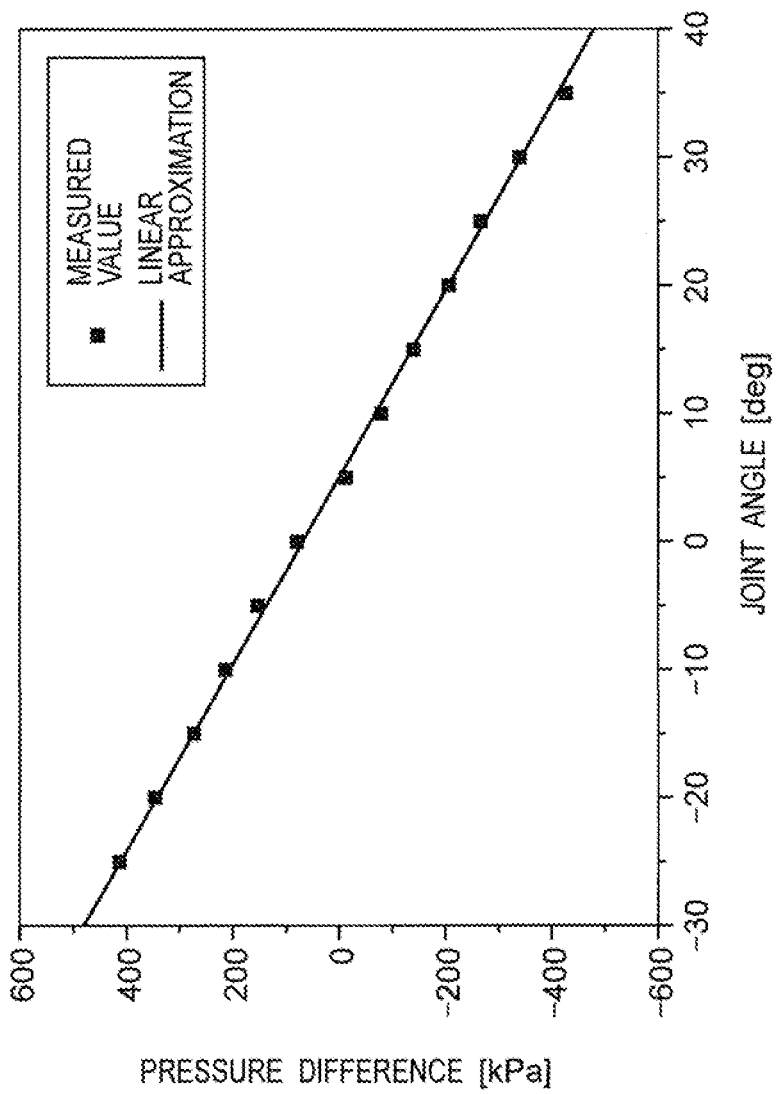
FIG. 6 is a view showing a structure for calculating a desired pressure difference in the first embodiment of the present invention.

The following description will discuss the desired pressure difference calculation means 14. In the case where forwardly and reversely rotation driving operations of the joint axes 6-1 and 6-2 are carried out by using competitive driving processes of the paired elastic expansion/contraction structural members 1, 1, shown in FIG. 3, a relationship between the joint angles and the inner-pressure difference of the paired elastic expansion/contraction structural member 1 is, for example, shown in FIG. 6. FIG. 6 shows the results of operations when an elastic expansion/contraction structural member (McKibben-type pneumatic artificial muscle) having an overall length of 250 mm and an inner diameter of 10 mm is used. As shown in FIG. 6, the measured results can be substantially approximated by a straight line. Therefore, the following linear equation representing a straight line can be used as an equation for calculating a desired pressure difference $\Delta P_d$:

[Formula 1]

$$\Delta P_d = A q_d + b \quad \text{Equation (1)}$$

In this case, A and b represent coefficients that can be found from the measured results of FIG. 6. Therefore, in the desired pressure difference calculation means 14, the desired pressure difference $\Delta P_d$ is calculated from the desired joint angle vector $q_d$ based on equation (1), and by inputting the resulting value to the pressure difference error compensation means 15 through the inner-state error calculation unit 109, a position controlling operation having a small stationary error with high precision can be realized. In this case, the relationship between the joint angle and the pressure difference is approximated by using the linear equation; however, the present invention is not limited thereto, and the approximation can made by using multidimensional polynomial equations, such as a quadratic equation. Moreover, another structure may be used in which a relationship between the output of the elastic body actuator 102 and the inner state of the elastic body actuator 102 (for example, relationship between the joint angle and the pressure difference) is preliminarily stored in a storage unit (not shown) of the control apparatus as a table, and based on the table stored in the storage unit, a desired value (for example, a desired value of the pressure difference) of the inner state of the elastic body actuator 102 is obtained by an inner-state desired value derivation unit (not shown) from the desired value (for example, the desired value of the joint angle) of the output of the elastic body actuator 102.

The desired pressure difference calculation means 14 calculates the relationship between the joint angle and the pressure difference through preliminary experiments, and stores the calculation results in the storage unit (not shown) as described earlier. However, the relationship between the output and the inner state (for example, the relationship between the joint angle and the pressure difference) varies due to an influence by gravity caused by a load applied to the tip of the robot arm 10, or another disturbance, or a characteristic change due to aging of the elastic body actuator 102. In order to correct the output error of the elastic body actuator 102 that consequently occurs, the adjustable desired pressure difference correction means 25 outputs an adjusted correcting value $\Delta P_{da}$ of the desired pressure difference.

With reference to the following equations (2) and (3), the following description will discuss one example of the adjustable desired pressure difference correction means 25. In the adjustable desired pressure difference correction means 25, a joint error $q_e$ is calculated from the joint angle desired value $q_d$ and the current joint angle q, and by using the joint error $q_e$, the adjusted correcting value $\Delta P_{da}$ of the desired pressure difference is calculated so that the desired pressure difference can be changed adjustably (in other words, upon occurrence of a joint error $q_e$, the desired pressure difference is changed so as to make the joint error $q_e$ smaller).

[Formula 2]

$$q_e = q_d - q \quad \text{Equation (2)}$$

[Formula 3]

$$\Delta P_{da} = \int K_p q_e dt + q_d \int K_I (q_d - q_o) q_e dt \quad \text{Equation (3)}$$

In this case, $K_p$ and $K_I$ are gains determined through preliminary experiments, $q_o$ represents a joint angle (initial value) when the competitive two elastic body actuators 102, 102 are kept neutral. Equation (3) is designed so as to correct the coefficient A and coefficient b of equation (1) respectively.

$$\int K_p q_e dt \quad \text{[Formula 4]}$$

The first half portion of equation (3), that is, formula (4), is used for finding an adjusted offset value by integrating a value obtained by multiplying the joint error $q_e$ by a gain, and this also functions as a correcting value for the coefficient b of equation (1).

$$\int K_I (q_d - q_e) q_e dt \quad \text{[Formula 5]}$$

Moreover, the latter half portion of equation (3), that is, formula (5), represents an adjusted gain value, and functions as a correcting value for the coefficient A. Since the influence by the error of the proportional coefficient A becomes greater as the corresponding position departs from the neutral point of the two competitive elastic body actuators 102, 102, weighting factors are given to the joint error $q_e$ depending on distances from the neutral point, and by integrating the resulting value, the coefficient A can be corrected.

As described above, by changing equation (3) adjustably in response to the current joint error $q_e$ (in other words, by changing so as to make the current joint error $q_e$ smaller), it becomes possible to correct equation (1), and consequently to function so as to reduce the joint error $q_e$.

Moreover, in the case where an ON instruction has been given to the low-pass filter from the correcting output control means 120 to the adjustable desired pressure difference correction means 25, a value obtained by allowing the adjusted correcting value $\Delta P_{da}$ of the desired pressure difference to pass the low-pass filter is outputted as the output of the adjustable desired pressure difference correction means 25. In the case where an OFF instruction has been given to the low-pass filter from the correcting output control means 120 to the adjustable desired pressure difference correction means 25, the adjusted correcting value $\Delta P_{da}$ of the desired pressure difference, without passing through the low-pass filter, is outputted as it is as the output of the adjustable desired pressure difference correction means 25.

The correcting output control means 120 gives to the adjustable desired pressure difference correction means 25 any one of the following instructions:

(i) an instruction for outputting the adjusted correcting value $\Delta P_{da}$ of the desired pressure difference, or an instruction for stopping the output, (ii) an instruction for outputting through the low-pass filter, and (iii) an instruction for holding the value of $\Delta P_{da}$ at a certain value. More specifically, the correcting output control means 120 controls the adjusted correcting value $\Delta P_{da}$ of the desired pressure difference by using at least one of the following conditions:

(1) Upon starting the robot arm 10, the adjustable desired pressure difference correction means 25 is not operated (not used), and after a lapse of a fixed period of time from the starting, the adjustable desired pressure difference correction means 25 is started to be operated (to be used). This is because, upon starting the robot arm 10, initial operations required for a normal starting process are carried out in some cases, and in these initial operations, for example, a sensor confirming process or the like is preferentially carried out rather than a precision adjusting process in positional control. Moreover, another reason is that the operations of the robot arm 10 themselves are unstable until the completion of the initial operations. For this reason, upon trying to operate adjustably (so as to make the error smaller), the stability of the robot arm 10 might be impaired. Therefore, until the completion of the initial operations of the robot arm 10 after the starting thereof, the operation of the adjustable desired pressure difference correction means 25 is stopped (in other words, the adjustable desired pressure difference correction means 25 is set to an OFF mode).

(2) During a fixed period of time from the input of the collision detection signal from the collision detection means 121, the output value of the adjustable desired pressure difference correction means 25 is held, and is not updated. In the case where an error correcting operation is carried out on the robot arm 10 that has failed to move along the track due to a collision with an external object, the robot arm 10 or the object with which it has collided might be damaged; therefore, during the fixed period of time after the detection of a collision, the output of the adjustable desired pressure difference correction means 25 is not updated so that the output value is held.

(3) Upon receipt of a signal indicating a repetitive track (repetitive signal for a desired track) from the desired track generation means 11, the adjustable desired pressure difference correction means 25 is operated (the adjustable desired pressure difference correction means 25 is used) (in other words, the adjustable desired pressure difference correction means 25 is set to an ON mode). This is because, since the effects of the adjustable desired pressure difference correction means 25 appear most preferentially upon repetitive operations, the adjustable desired pressure difference correction means 25 is operated so as to use the adjustable desired pressure difference correction means 25 only upon the repetitive operations. For this reason, the adjustable desired pressure difference correction means 25 is provided with, for example, determination means 25a so that in the case where, upon receipt of the repetitive signal for a desired track from the desired track generation means 11 by the adjustable desired pressure difference correction means 25, the determination means 25a determines that tracks of the elastic body actuator 102, obtained when desired values of the elastic body actuator 102 are time-sequentially aligned, are repetitive (for example, when the determination means 25a has determined that a flag indicating repetitive operations is recorded in a signal from the desired track generation means 11), it is determined that the adjustable desired pressure difference correction means 25 is used.

(4) In the case where, upon receipt of a signal indicating a repetitive track (repetitive signal for a desired track) from the desired track generation means 11, the hand position error of the robot arm 10 is lower than a threshold value, the output value of the adjustable desired pressure difference correction means 25 is held and is not updated. This is because, in the case where the correcting output control means 120 has determined that, even when the pressure difference is adjustably corrected (the pressure difference is corrected so as to make the error smaller), the error is no longer made smaller (the hand position error becomes lower than the threshold value), the updating process of the adjustable desired pressure difference correction means 25 needs to be stopped (in other words, the adjustable desired pressure difference correction means 25 is set to a holding (update-stopping) mode).

(5) Upon starting the operation of the adjustable desired pressure difference correction means 25 (upon switching from the OFF mode to the ON mode), and upon starting an updating process again from the updating stopped state (upon switching from the holding (update-stopping) mode to the ON mode), the output of the adjustable desired pressure difference correction means 25 is released after having been allowed to pass through the low-pass filter of the adjustable desired pressure difference correction means 25, for a preliminarily determined period of time. This is because, upon switching the above modes of the adjustable desired pressure difference correction means 25, since the desired pressure difference tends to drastically change to make the operations of the robot arm 10 unstable, the subsequent instability can be prevented.

Figure 7:
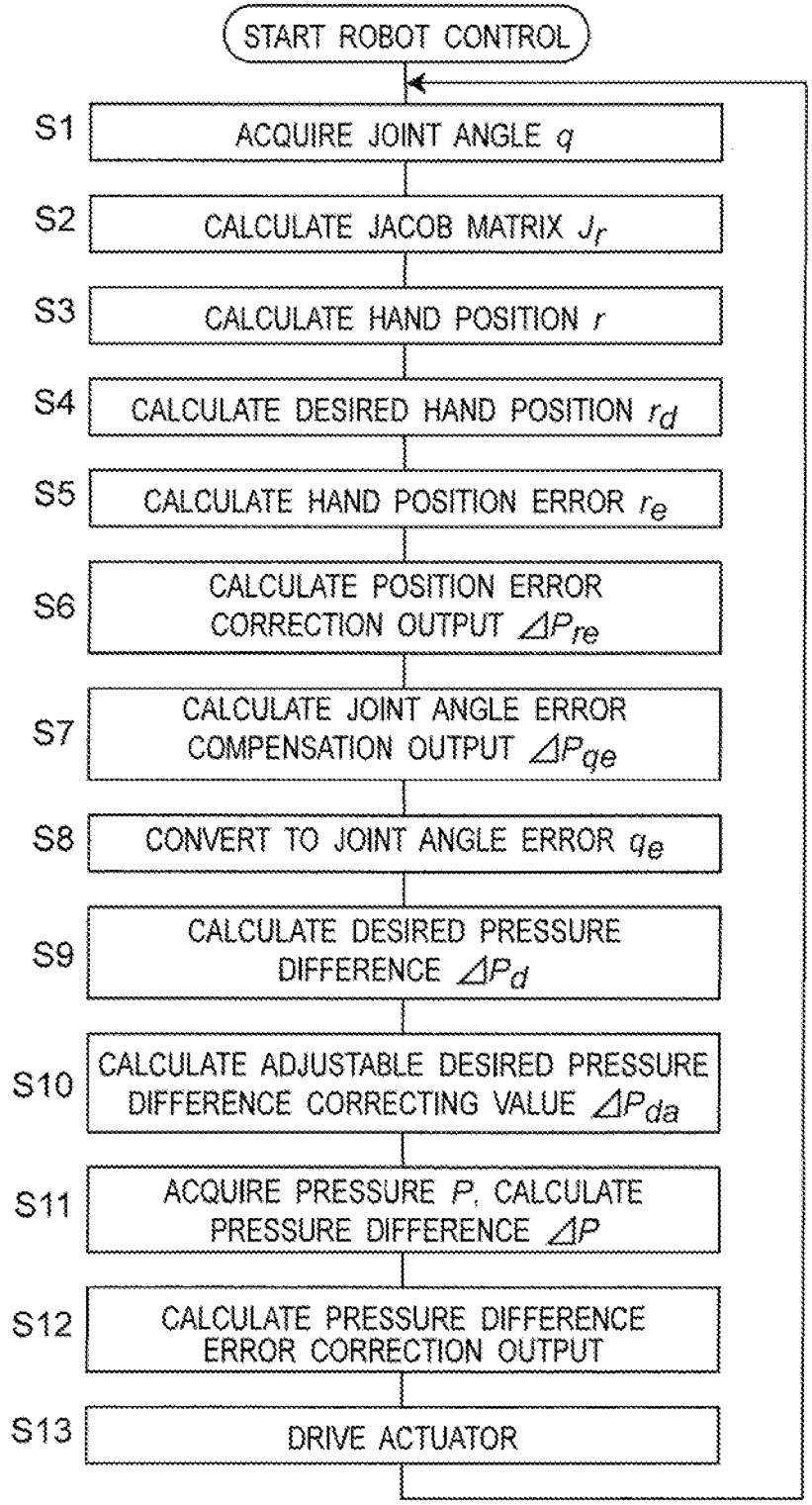
FIG. 7 is a flow chart showing actual operation steps of a control program in the control apparatus for the elastic body actuator according to the first embodiment of the present invention.

With reference to a flow chart of FIG. 7, the following description will discuss actual operation steps of a control program formed based on the above-mentioned principle.

In step S1, the joint angle data (joint variable vector or joint angle vector q) measured by the encoder 8 is received by the control apparatus.

Next, in step S2, calculations for a Jacob matrix $J_r$ or the like, required for the kinematics calculations for the robot arm 10, are carried out by the approximation inverse kinematics calculation means (23a, 23b, 23c).

Next, in step S3, the current hand position and posture vector r of the robot arm 10 is calculated by the forward kinematics calculation means 21 (processes in the forward kinematics calculation means 21) based on the joint angle data (joint angle vector q) of the robot arm 10.

Next, in step S4, the desired track generation means 11 calculates a hand position and posture desired vector $r_d$ of the robot arm 10 based on the operation program of the robot arm 10 preliminarily stored in the desired track generation means 11.

Next, in step S5, the output error calculation unit 108 calculates a hand position and posture error $r_e$, that is, a difference between the hand position and posture desired vector $r_d$ and the current hand position and posture vector r.

Next, in step S6, the position error compensation means 12 calculates a position error correction output $\Delta P_{re}$ from the hand position and posture error $r_e$ (processes in the position error compensation means 12). Specific examples of the position error compensation means 12 include a PID compensator. In the case of the PID compensator, in step S6, a summed value of three values, that is, a value obtained by multiplying the hand position and posture error $r_e$ by a proportional gain, a value obtained by multiplying a differentiated value of the hand position and posture error $r_e$ by a differential gain, and a value obtained by multiplying an integrated value of the hand position and posture error $r_e$ by an integration gain, is prepared as a position error correction output $\Delta P_{re}$. By appropriately adjusting the three gains of proportional, differentiated and integrated values, corresponding to a diagonal matrix of constants, the controlling operation is exerted so as to converge the position error to zero.

Next, in step S7, by multiplying it by a reverse matrix of the Jacob matrix $J_r$ calculated in step S2, the position error correction output $\Delta P_{re}$ is converted from the value relating to the error of the hand position to a joint error correction output $\Delta P_{qe}$ corresponding to a value relating to an error in the joint angle, by the approximation inverse kinematics calculation means 23b (operations in the approximation inverse kinematics calculation means 23b).

Next, in step S8, by multiplying it by a reverse matrix of the Jacob matrix $J_r$, the hand position and posture error $r_e$ is converted an error $q_e$ of the joint angle vector by the approximation inverse kinematics calculation means 23a, 23c (operations in the approximation inverse kinematics calculation means 23a, 23c).

Next, in step S9, a value obtained by adding the error $q_e$ of the joint angle vector calculated in step S8 to the current joint angle q measured by the encoder 8 is prepared as a desired joint angle vector $q_d$ by the desired pressure difference calculation means 14 so that a desired pressure difference $\Delta P_d$ is calculated by the desired pressure difference calculation means 14.

Next, in step S10, a value obtained by adding the error $q_e$ of the joint angle vector calculated in step S8 to the current joint angle q measured by the encoder 8 is prepared as a desired joint angle vector $q_d$ so that an adjustable correcting value $\Delta P_{da}$ corresponding to an adjusted desired pressure difference is calculated by the adjustable desired pressure difference correction means 25.

Next, in step S11, the inner pressure value of each actuator 102, measured by the pressure sensor 9 serving as one example of the inner-state measuring means 107, is received by the control apparatus so that the current pressure difference $\Delta P$ between the inner pressures of the two actuators 102 and 102 that are competitively driven is calculated by the pressure difference calculation means 13.

Next, in step S12, from a value obtained by adding the joint error correction output $\Delta P_{qe}$ calculated by the approximation inverse kinematics calculation means 23b in step S7, the desired pressure difference $\Delta P_d$ calculated by the desired pressure difference calculation means 14, and the adjusted correcting value $\Delta P_{da}$ of the desired pressure difference calculated by the adjustable desired pressure difference correction means 25 to one another, the current pressure difference $\Delta P$, calculated by the pressure difference calculation means 13 in step S11, is subtracted so that a pressure difference error $\Delta P_e$ is calculated by the pressure difference error compensation means 15 (processes in the pressure difference error compensation means 15). Moreover, in step S12, a pressure difference error correction output is calculated by the pressure difference error compensation means 15 from the pressure difference error $\Delta P_e$ (processes in the pressure difference error compensation means 15). For example, a PID compensator may be used as the pressure difference error compensation means 15.

Next, in step S13, the pressure difference error correction output is given to each of the flow-rate control electromagnetic valves 18 as a voltage instruction value, through the input/output IF 20 such as a D/A board, from the pressure difference error compensation means 15, and by allowing the flow-rate control electromagnetic valve 18 to change the inner pressure of each of the actuators 102, rotation motions of the respective joint axes 6-1 and 6-2 of the robot arm 10 are generated.

By repeatedly executing the above steps S1 to S13 as a controlling calculation loop, the controlling operation of the robot arm 10 is realized.

Figure 9A:
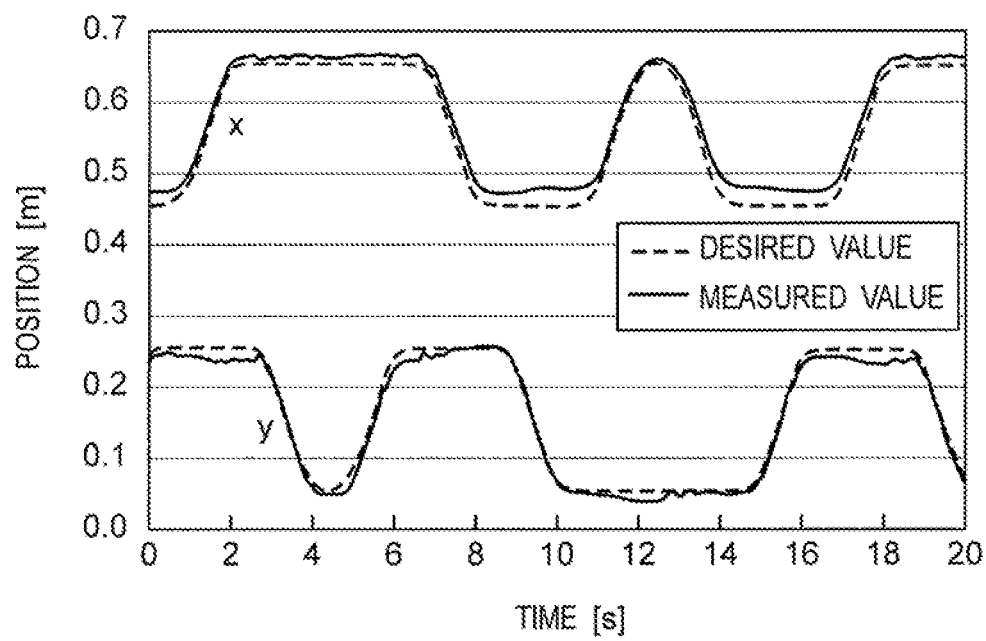
FIG. 9A is a view showing results of operations when a track following control operation of a hand position is carried out on the robot arm shown in FIG. 2, by a conventional control apparatus that uses only a desired pressure difference calculation means shown in FIG. 6, without using an adjustable desired inner-state correction means.
Figure 9B:
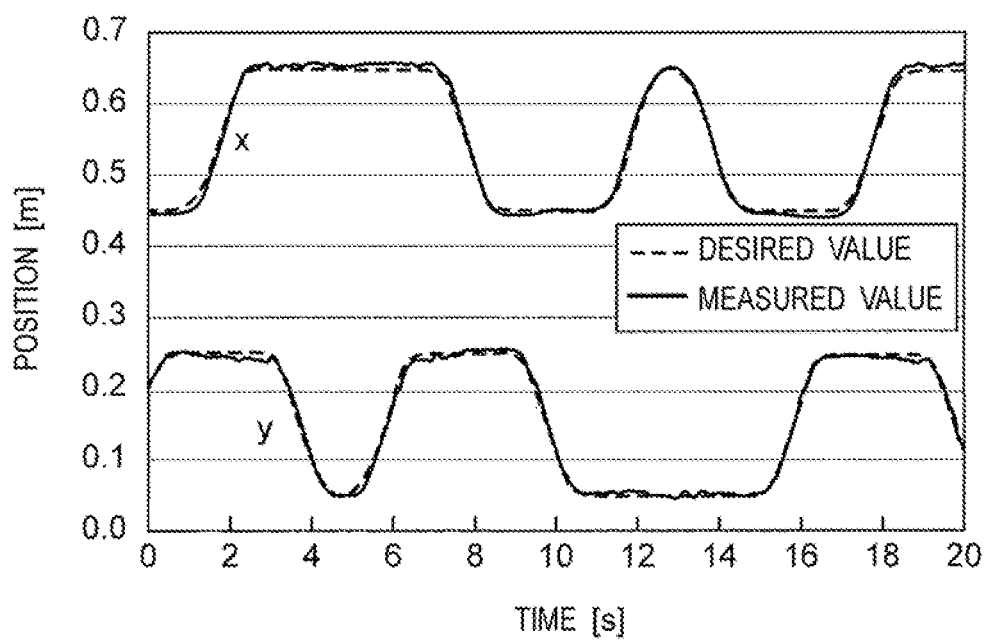
FIG. 9B is a view showing results of operations when a track following control operation of a hand position is carried out by using the control apparatus for the elastic body actuator according to the first embodiment of the present invention shown in FIG. 5.

FIGS. 9A and 9B show the results of operations in which a track following control operation of a hand position was carried out on the robot arm 10 shown in FIG. 2, by a conventional control apparatus that uses only the desired pressure difference calculation means shown in FIG. 6, without using the adjustable desired inner-state correction means 111, as well as the results of operations in which a track following control operation of a hand position was carried out thereon by using the control apparatus of the first embodiment shown in FIG. 5. For example, the robot arm 10 shown in FIG. 2 uses an elastic expansion/contraction structural member 1 that has the first axis 308 and the second axis 303, each having a natural length of 295 mm and an inner diameter of 10 mm.

FIGS. 9A and 9B show the results of measurements of desired values of the hand position of a robot arm having two degrees of freedom. In the present experiments, tracks which allow the hand position to follow a square shape having a length of 0.2 m in each side within the xy plane are given as desired values.

FIG. 9A shows the results of controlling operations by a conventional control apparatus. In the conventional control apparatus, in the case where the relationship between an actual pressure difference and an angle deviates from a relationship between the desired pressure difference and the angle predetermined by preliminary measurements, an error becomes greater as shown in FIG. 9A. Accordingly, it is found that the following characteristic is not good.

In contrast, FIG. 9B shows the results of controlling operations by the control apparatus of the first embodiment shown in FIG. 5. By the effects of the addition of the adjustable desired inner-state correction means 111, the error becomes smaller and it is found that the following characteristic becomes superior.

As described above, according to the control apparatus of the first embodiment, by installing the pressure difference error compensation means 15 to form an inner-pressure controlling system by which the inner state of the elastic body actuator 102 is fed back, and by installing the desired pressure difference calculation means 14 and the adjustable desired pressure difference correction means 25 to form a control system by which a desired pressure difference that is one example of the desired inner state of the elastic body actuator 102 is fed forward, it becomes possible to control the robot arm 10 with high precision, while providing a superior response characteristic even under an environment out of the preliminarily assumed environment, with little stationary error.

(Second Embodiment)

Figure 8:
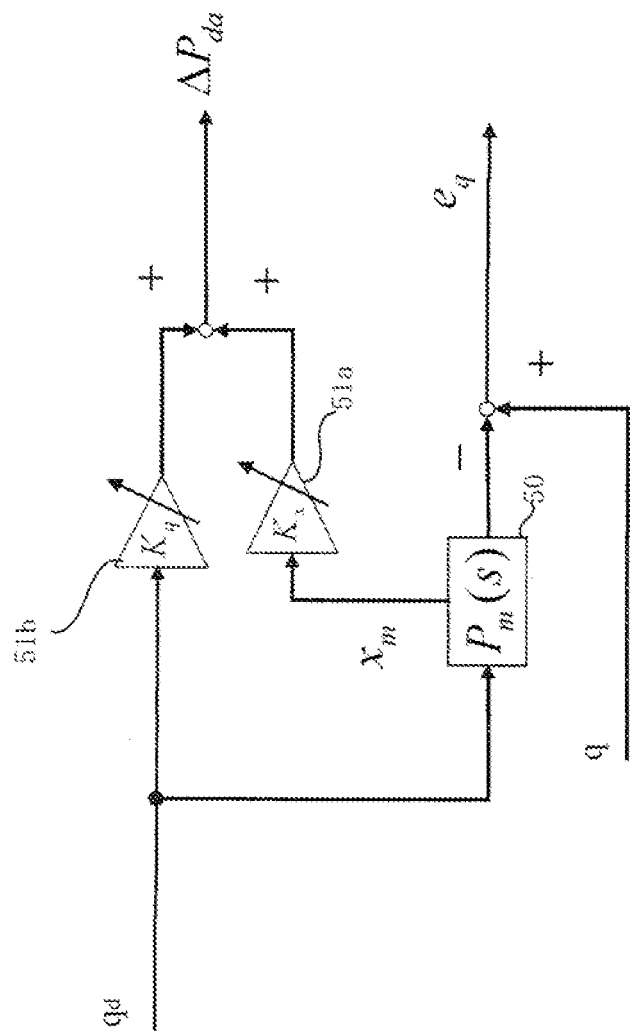
FIG. 8 is a view showing a structure of an adjustable desired pressure difference correction means of a control apparatus for the elastic body actuator according to a second embodiment of the present invention.

FIG. 8 is a view showing one example of the adjustable desired pressure difference correction means 25. Reference numeral 50 represents a reference model to be followed by the joint angle of the robot arm 10, and reference numerals 51a and 51b are variable gains. The reference model 50 is preliminarily determined based on a response characteristic and the like required for the robot arm 10. The reference model 50 is expressed by a transfer function or a state equation, and each of the models has a joint angle desired value $q_d$ as an input and a joint angle q as an output. Supposing that the joint angle desired value $q_d$ is used as the input, the adjustable desired pressure difference correction means 25 calculates a difference $e_q$ between the output of the reference model 50 and the current joint angle q, and by using the difference $e_q$, the adjustable desired pressure difference correction means 25 calculates an adjusted correcting value $\Delta P_{da}$ of the desired pressure difference so that the desired pressure difference can be adjustably changed (the desired pressure difference is changed so as to make the error smaller). The variable gains 51a and 51b are calculated by the following equations (4) and (5).

[Formula 6]

$$K_x(t) = a_x x_m e_q + \int b_x x_m e_q dt \qquad \text{Equation (4)}$$

$$K_q(t) = a_q q_d e_q + \int b_q q_d e_q dt \qquad \text{Equation (5)}$$

In this case, $a_x$, $a_q$, $b_x$, and $b_q$ are respectively fixed values determined through preliminary experiments. Moreover, $x_m$ represents a state vector of the reference model 50. Equations (4) and (5) are equations of feed-forward terms for use in following the reference model 50, known as a simple adjustable control model, and by multiplying the joint angle desired value $q_d$ and the state vector $x_m$ of the reference model 50 respectively by a gain that varies in response to the difference $e_q$ of the joint angles, the difference can be changed adjustably in response to the current joint angle difference $e_q$ (the difference is changed so as to make the error $e_q$ smaller). Since a model that can substantially follow the desired value is selected within a frequency band to be used for a control subject (the elastic body actuator 102) as the reference model 50 in most cases, the fact that a change is made adjustably depending on the difference $e_q$ of the joint angles is equivalent to adjustably changing in response to the current joint error $q_e$. Therefore, based on equations (4) and (5), the adjustable desired pressure difference correction means 25 is allowed to function to reduce the joint error $q_e$.

Moreover, in the case where an ON instruction has been given to the low-pass filter from the correcting output control means 120, a value obtained by allowing the adjusted correcting value $\Delta P_{da}$ of the desired pressure difference to pass the low-pass filter is outputted as the output of the adjustable desired pressure difference correction means 25.

The other structures are the same as those of the control apparatus of the first embodiment shown in FIG. 5; therefore, the description thereof will not be given.

The same effects as those obtained in the first embodiment can also be obtained in the second embodiment.

(Third Embodiment)

Figure 12:
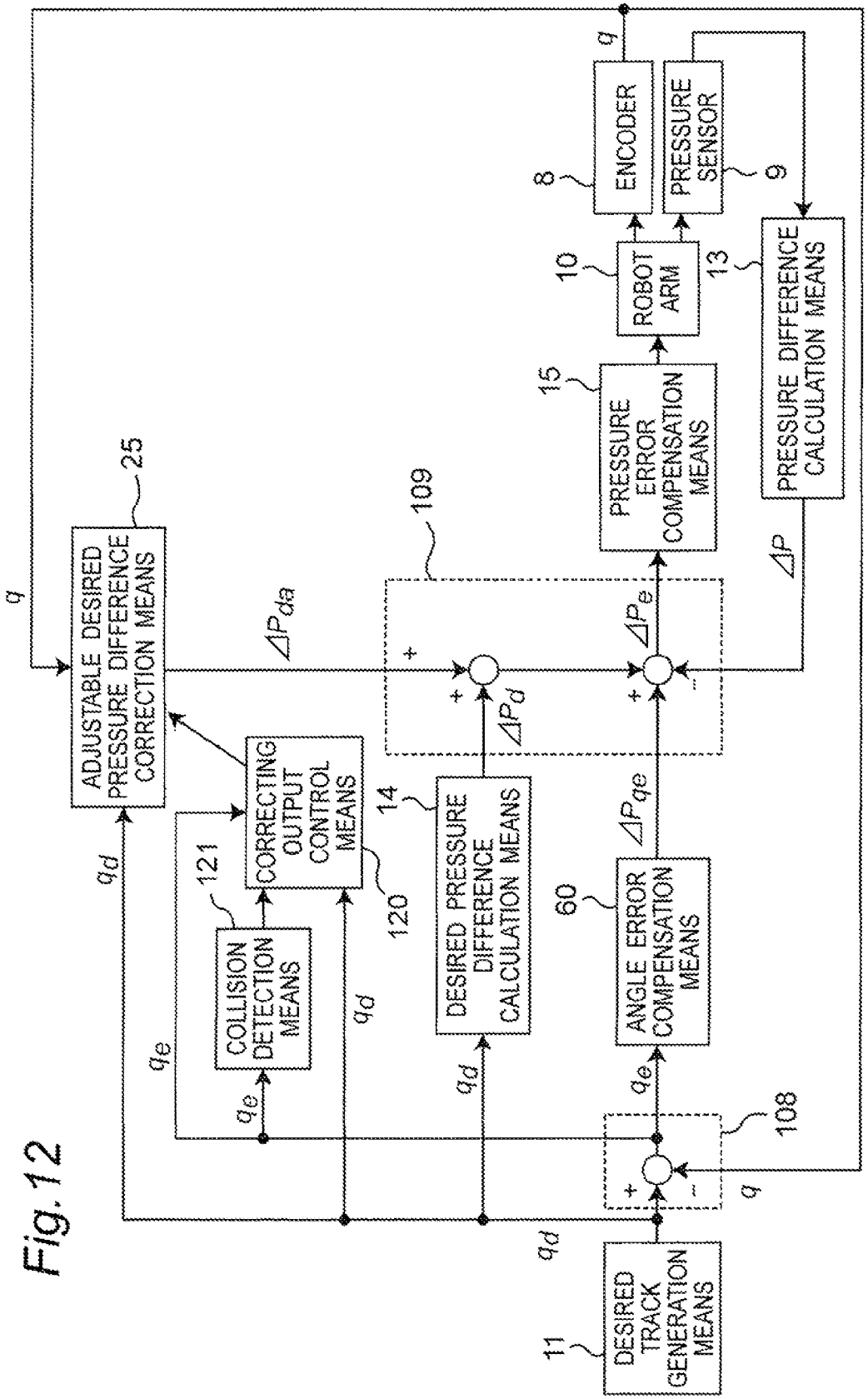
FIG. 12 is a control block diagram showing an elastic body actuator control apparatus according to a third embodiment of the present invention.

FIG. 12 is a view showing a specific structure of a control apparatus of an elastic body actuator 102 according to a third embodiment of the present invention. The control apparatus is, for example, installed in the control computer 19. In FIG. 12, reference numeral 10 represents a robot arm that is a control subject of the control apparatus of the elastic body actuator 102, shown in FIG. 2.

The desired track generation means 11, which functions as one example of the desired output generation means 101, outputs a desired joint angle vector $q_d$ so as to realize desired operations of the robot arm 10. The desired operation of the robot arm 10 is provided with recorded flags relating to positions ($q_{d0}$, $q_{d1}$, $q_{d2}$, . . . ) at respective points of time (t=0, t=$t_1$, t=$t_2$, . . . ) and indicating whether or not repetitive operations are required, which have been preliminarily recorded in response to each of desired jobs, and the desired track generation means 11 utilizes polynomial interpolation based on information of the angles ($q_{d0}$, $q_{d1}$, $q_{d2}$, . . . ) at respective points of time (t=0, t=$t_1$, t=$t_2$, . . . ) and the joint angle vector q to interpolate the track between the respective points so that a desired joint angle vector $q_d$ is generated.

To the output error calculation unit 108, the joint angle desired vector $q_d$ and the joint angle vector q outputted from the robot arm 10 are inputted, and a joint angle error $q_e = q - q_d$ is calculated so that the resulting joint angle error $q_e$ is outputted as one example of the output error 114.

To angle error compensation means 60 serving as one example of the output error compensation means 103, the joint angle error $q_e$ outputted by the output error calculation unit 108 is inputted, and an angle error correction output $\Delta P_{qe}$ serving as one example of the output 115 is released therefrom toward the inner-state error calculation unit 109.

To the desired pressure difference calculation means 14 serving as one example of the desired inner-state determination means 105, the desired joint angle vector $q_d$ that is an output of the desired track generation means 11 is inputted so that, based on the desired joint angle vector $q_d$, a desired pressure difference (desired value for a pressure difference) $\Delta P_d = [\Delta P_{1d}, \Delta P_{2d}]^T$ is calculated from the desired joint angle vector $q_d$ as one example of the inner-state desired value 116, and the resulting value is outputted toward the desired inner-state error calculation unit 109. In this case, $\Delta P_{1d}$ and $\Delta P_{2d}$ respectively correspond to desired values of pressure differences between the elastic expansion/contraction structural members 1-1a, 1-1b and the elastic expansion/contraction structural members 1-2a, 1-2b.

To the adjustable desired pressure difference correction means 25 serving as one example of the adjustable desired inner-state correction means 111, the joint angle vector q measured by the robot arm 10 and the desired joint angle vector $q_d$ corresponding to the output of the desired track generation means 11 are inputted so that adjustable desired pressure difference correction means 25 calculates an adjusted correcting value of the desired pressure difference (one example of the inner-state desired correcting value 117), $\Delta P_{da} = [\Delta P_{1da}, \Delta P_{2da}]^T$, and the calculated adjusted correcting value $\Delta P_{da}$ is outputted to the inner-state error calculation unit 109 from the adjustable desired pressure difference correction means 25. In this case, the $\Delta P_{1da}$ and $\Delta P_{2da}$ respectively correspond to adjusted correcting values of the desired values (desired pressure differences) of pressure differences between the elastic expansion/contraction structural members 1-1a and 1-1b, as well as between the elastic expansion/contraction structural members 1-2a and 1-2b.

The inner-state error calculation unit 109 adds the adjusted correcting value $\Delta P_{da}$ for the desired pressure difference outputted from the adjustable desired pressure difference correction means 25, the value $\Delta P_d$ outputted from the desired pressure difference calculation means 14, and the value $\Delta P_{qe}$ outputted from the angle error compensation means 60 to one another, and subtracts the value $\Delta P$ outputted from the pressure difference calculation means 13 from the added value so that the calculated pressure difference error (pressure error value) $\Delta P_e$ is outputted to the pressure difference error compensation means 15.

The collision detection means 121 detects the fact that the robot arm 10 has collided with an external object, and outputs a collision detection signal to the correcting output control means 120. As one example for collision detection, FIG. 12 shows a structure in which the joint angle error of the robot arm 10 is utilized. In this method, the joint angle error is differentiated, and in the case where the value of the time-based differentiation of the error becomes greater than a preliminarily determined threshold value, it is assumed that a collision has occurred. In addition, the collision detection method may include a method using a camera for detection, or a method in which a contact sensor or a force sensor is used for detection.

The other structures are the same as those of the control apparatus of the first embodiment shown in FIG. 5; therefore, the description thereof will not be given.

The same effects as those obtained in the first embodiment can also be obtained in the third embodiment.

Moreover, in the above embodiments, a joint angle is used as an output; however, the present invention is not limited thereto, the output measuring means 104 may be prepared as a displacement speed sensor serving as one example of a displacement speed measuring means, and the same operations can be obtained by carrying out a displacement speed controlling process with the displacement speed being set as an output value.

Furthermore, in the above embodiments, a joint angle is used as an output; however, the present invention is not limited thereto, the output measuring means 104 may be prepared as a force sensor serving as one example of a force measuring means, and the same operations can be obtained by carrying out a force controlling process with the force being set as an output value.

In the above embodiments, a sensor is installed as one example of the inner-state measuring means 107; however, an observer (observing device) may be installed, and the same effects can be obtained by using the structure in which the inner state is estimated by the observer so that the estimated value of the inner state is utilized.

Moreover, in the above embodiments, descriptions have been given by exemplifying a fluid pressure driving actuator that is driven by a fluid pressure as the elastic body actuator 102; however, the present invention is not limited thereto, another actuator, which drives an elastic member, such as a conductive polymer, a dielectric polymer, or any one of various kinds of gels, by using electrical stimulus, may be used, and the same effects can be obtained by adopting an electric field, a charge quantity or the like as the inner state.

Figure 11A:
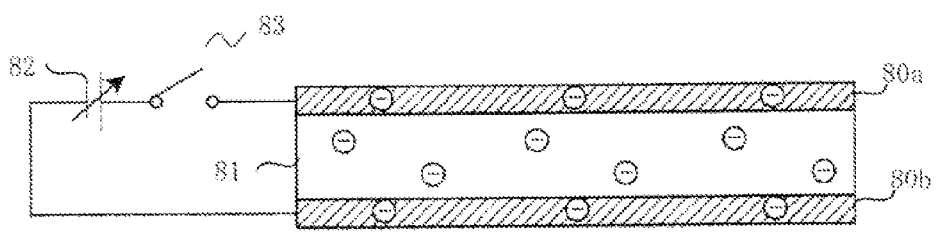
FIG. 11A is a view showing a structure and operations of the conductive polymer actuator for driving a robot arm serving as a subject to be controlled by the control apparatus for the elastic body actuator according to the first embodiment of the present invention.
Figure 11B:
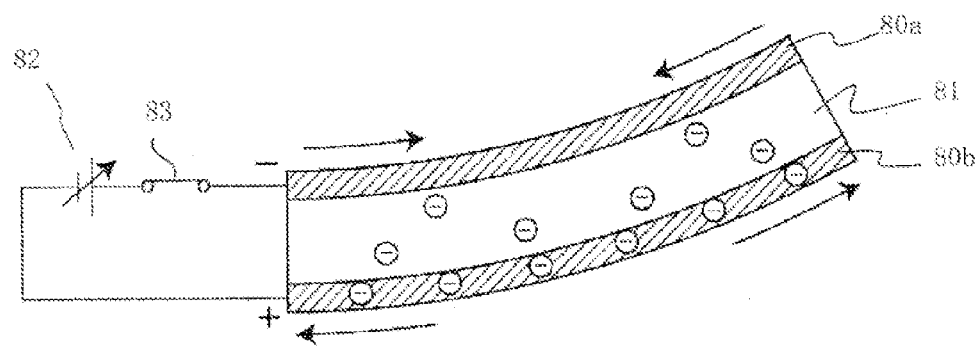
FIG. 11B is a view showing a structure and operations of the conductive polymer actuator for driving a robot arm serving as a subject to be controlled by the control apparatus for the elastic body actuator according to the first embodiment of the present invention.
Figure 11C:
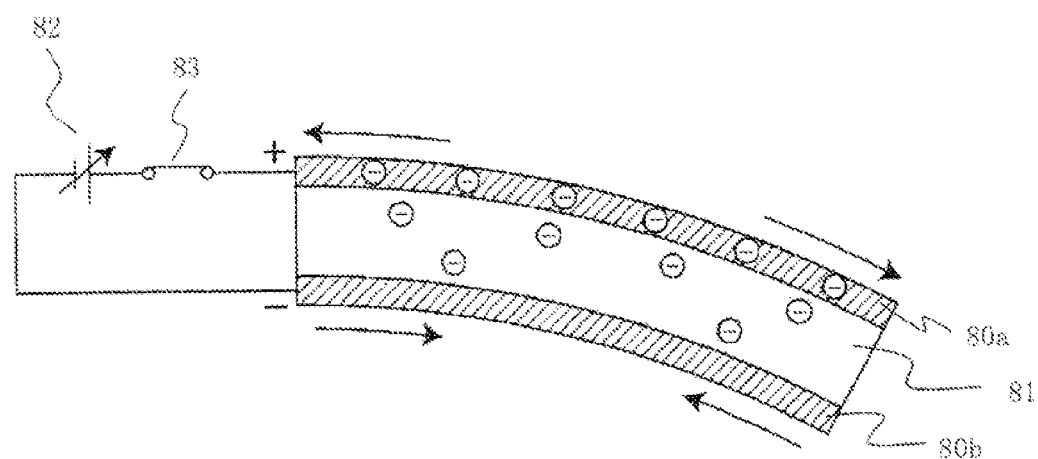
FIG. 11C is a view showing a structure and operations of the conductive polymer actuator for driving a robot arm serving as a subject to be controlled by the control apparatus for the elastic body actuator according to the first embodiment of the present invention.

FIGS. 11A to 11C are explanatory views that illustrate structures and operations of a conductive polymer actuator serving as one example of the elastic body actuator 102. This actuator has a structure in which a solid-state electrolysis configuration body 81 is sandwiched by polyaniline films 80a and 80b that are conductive polymer films (see FIG. 11A). By turning a switch 83 on, an electric potential difference set by a power supply 82 is given between the polyaniline films 80a and 80b so that anions are inserted into one of the polyaniline films 80b to be expanded, while anions are separated from the other polyaniline film 80a to be contracted, so that a flexure deformation is generated as a result (see FIG. 11B). In this case, one of the polyaniline film 80b serves as an electrode that is connected to the other polyaniline film 80a with the electrolysis configuration body 81 being interposed therebetween. In the case of a reversed electric potential difference, the polyaniline films 80a and 80b are deformed in reversed directions, as shown in FIG. 11C.

Figure 10:
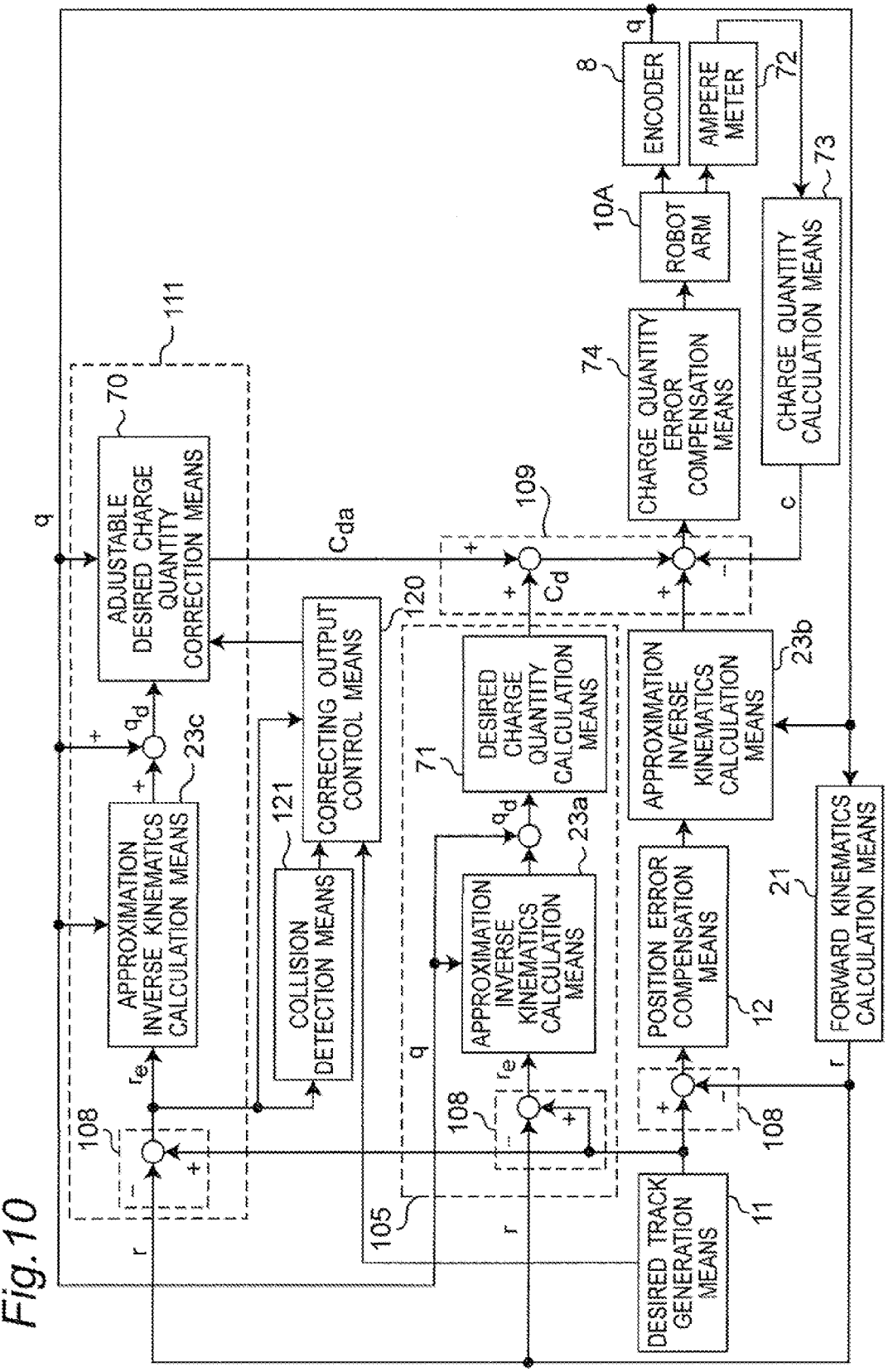
FIG. 10 is a control block diagram showing a structure which uses a conductive polymer actuator serving as one example of the elastic body actuator control apparatus according to the first embodiment of the present invention.

FIG. 10 is a view showing a structure of a control apparatus for an elastic body actuator in the case where the conductive polymer actuator is used as the elastic body actuator for a robot arm 10A. FIG. 10 is different from the configuration diagram of FIG. 5 in that the pressure sensor 9, the adjustable desired pressure difference correction means 25, the pressure difference calculation means 13, the desired pressure difference calculation means 14, and the pressure difference error compensation means 15 are respectively replaced by an ampere meter 72, adjustable desired charge quantity correction means 70, charge quantity calculation means 73, desired charge quantity calculation means 71, and charge quantity error compensation means 74.

The desired charge quantity calculation means 71, which serves as one example of the desired inner-state determination means 105, calculates a desired charge quantity $c_d$ from the desired angle vector $q_d$, and outputs the resulting value to the inner-state error calculation unit 109.

The adjustable desired charge quantity correction means 70 serves as one example of the adjustable desired inner-state correction means 111. The adjustable desired charge quantity correction means 70 outputs a correcting value $c_{da}$ for the desired charge quantity to the inner-state error calculation unit 109 so as to correct the output error of the conductive polymer actuator.

The ampere meter 72, which serves as one example of the inner-state measuring means 107, measures a current i flowing through each of the conductive polymer actuators. The current i, measured by the ampere member 72, is integrated in the charge quantity calculation means 73 so that the current charge quantity c can be calculated, and the calculated current charge quantity c is outputted to the inner-state error calculation unit 109.

To the position error compensation means 12, the hand position and posture error $r_e$ outputted from the output error calculation unit 108 is inputted, and a position error correction output $\Delta c_{re}$ is outputted to the approximation inverse kinematics calculation means 23b.

The approximation inverse kinematics calculation means 23b, which receives the current value q of the joint angle vector measured in the robot arm 10 and the position error correction output $\Delta c_{re}$ from the position error compensation means 12, outputs a joint error correction output $\Delta c_{qe}$ toward the inner-state error calculation unit 109. In the inner-state error calculation unit 109, the current charge quantity c obtained by the charge quantity calculation means 73 is subtracted from a value obtained by adding the joint error correction output $\Delta c_{qe}$, the desired charge quantity $c_d$, and the desired charge quantity correcting value $\Delta C_{da}$ to one another, so that the resulting value (charge quantity error $c_e$) is obtained and outputted to the charge quantity error compensation means 74.

The charge quantity error compensation means 74 to which the charge quantity error $c_e$ has been inputted from the inner-state error calculation unit 109 outputs a charge quantity error correction output u to the robot arm 10 so as to correct the error of the charge quantity.

With the above-mentioned arrangement, the present invention can also he implemented by using a conductive polymer actuator.

Moreover, among the above various embodiments, desired embodiments may be combined with one another as necessary so that the respective effects can be exerted and obtained.

In general, the adjustable control may cause degradation in stability, in comparison with the case in which no adjustable control is carried out (the control is not carried out adjustably). However, according to the control apparatus of the first embodiment, with respect to the desired pressure difference $\Delta P_d$ that forms the basis, the desired inner-state determination means 105 including the desired pressure difference calculation means 14 carries out the corresponding calculations, and an error that cannot be corrected by the calculations is compensatively corrected by the adjustable desired inner-state correction means 111 including the adjustable desired pressure difference correction means 25. For this reason, in comparison with the arrangement in which no desired pressure difference calculation means 14 is used, the fixed values ($a_x$, $a_q$, $b_x$, and $b_q$) inside the adjustable desired pressure difference correction means 25 can be made smaller so that the desired pressure difference can be adjustably corrected without causing degradation in stability (the desired pressure difference can he corrected so as to make the error smaller). Moreover, in the case where the functions of the adjustable desired pressure difference correction means 25 are unnecessary, the functions of the adjustable desired pressure difference correction means 25 can also be stopped by the correcting output control means 120; therefore, it is possible to exert the effect of not causing degradation in stability.

By properly combining the arbitrary embodiments of the aforementioned various embodiments, the effects possessed by the embodiments can be produced.

INDUSTRIAL APPLICABILITY

The control apparatus and control method, as well as the control program, for an elastic body actuator of the present invention are effectively applicable to a control apparatus and a control method, as well as a control program, for carrying out a positional control operation, such as a track control operation or the like of the hand position of a robot arm that is operated by an elastic body actuator. Moreover, the present invention is not limited to the robot arm, and is also applicable to a control apparatus and a control method, as well as a control program, for a rotation mechanism using an elastic body actuator in a production facility or the like, or a control apparatus and a control method, as well as a control program, for a direct-driven mechanism using an elastic body actuator in a linear slider, a pressing device, or the like.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A control apparatus for an elastic body actuator comprising:
a processor;
an inner-state measuring unit that measures an inner state of the elastic body actuator;
an output measuring unit that measures an output of the elastic body actuator;
an output error compensation unit to which a desired value of the output of the elastic body actuator and a measured value of the output of the elastic body actuator measured by the output measuring unit are inputted so as to compensate for an output error;
a desired inner-state determination unit that determines a desired value of the inner state of the elastic body actuator based on the desired value of the output of the elastic body actuator;
an adjustable desired inner-state correction unit that, when an error occurs between the desired value of the output of the elastic body actuator and the measured value of the output of the elastic body actuator, determines, using the processor, a desired correcting value of the inner state so as to make the error smaller, wherein the adjustable desired inner-state correction unit calculates an adjusted offset value obtained by integrating a value obtained by multiplying a value prepared by subtracting an output value from the desired value of the output by a gain, and an adjusted gain value obtained by integrating a value obtained by multiplying a value obtained by multiplying a value prepared by subtracting an initial value from the desired value of the output by a value prepared by subtracting the output value from the desired value of the output, by a gain, so that a value obtained by adding a value prepared by multiplying the adjusted gain value by the desired value of the output to the adjusted offset value is set as the desired correcting value of the inner state; and an inner-state error compensation unit that calculates an inner-state error correction based on the desired value for the inner state outputted from the desired inner-state determination unit, the desired correcting value for the inner state outputted from the adjustable desired inner-state correction unit, and an output from the inner-state measuring unit, and outputs the calculated inner-state error correction to the elastic body actuator to compensate for an inner-state error by controlling the measured value of the output of the elastic body actuator to be set to the desired value of the output.

2. The control apparatus for an elastic body actuator according to claim 1, wherein the desired inner-state determination unit further acquires a measured value of an output of the elastic body actuator, and determines a desired value of the inner state of the elastic body actuator based on the desired value of the output of the elastic body actuator and the measured value of the output of the elastic body actuator.

3. The control apparatus for an elastic body actuator according to claim 1, further comprising:

an addition unit that adds the output of the desired inner-state determination unit to the output of the adjustable desired inner-state correction unit, and outputs a resulting value of addition to the inner-state error compensation unit.

4. A control apparatus for an elastic body actuator comprising:

a processor;

an inner-state measuring unit that measures an inner state of the elastic body actuator;

an output measuring unit that measures an output of the elastic body actuator;

an output error compensation unit to which a desired value of the output of the elastic body actuator and a measured value of the output of the elastic body actuator measured by the output measuring unit are inputted so as to compensate for an output error;

a desired inner-state determination unit that determines a desired value of the inner state of the elastic body actuator based on the desired value of the output of the elastic body actuator;

an adjustable desired inner-state correction unit that, when an error occurs between the desired value of the output of the elastic body actuator and the measured value of the output of the elastic body actuator, determines, using the processor, a desired correcting value of the inner state so as to make the error smaller, the adjustable desired inner-state correction unit comprising a reference model so that, when an error occurs among the output desired value, an output of the reference model, and the output of the elastic body actuator, values, obtained by multiplying the desired value of the output and a state variable of the reference model by a gain that makes the error smaller, are added to each other by the adjustable desired inner-state correction unit so as to be set as the desired correcting value of the inner state; and an inner-state error compensation unit that calculates an inner-state error correction based on the desired value for the inner state outputted from the desired inner-state determination unit, the desired correcting value for the inner state outputted from the adjustable desired inner-state correction unit, and an output from the inner-state measuring unit, and outputs the calculated inner-state error correction to the elastic body actuator to compensate for an inner-state error by controlling the measured value of the output of the elastic body actuator to be set to the desired value of the output.

5. A control apparatus for an elastic body actuator comprising:

a processor;

an inner-state measuring unit that measures an inner state of the elastic body actuator;

an output measuring unit that measures an output of the elastic body actuator;

an output error compensation unit to which a desired value of the output of the elastic body actuator and a measured value of the output of the elastic body actuator measured by the output measuring unit are inputted so as to compensate for an output error;

a desired inner-state determination unit that determines a desired value of the inner state of the elastic body actuator based on the desired value of the output of the elastic body actuator;

an adjustable desired inner-state correction unit that, when an error occurs between the desired value of the output of the elastic body actuator and the measured value of the output of the elastic body actuator, determines, using the processor, a desired correcting value of the inner state so as to make the error smaller, an inner-state error compensation unit that calculates an inner-state error correction based on the desired value for the inner state outputted from the desired inner-state determination unit, the desired correcting value for the inner state outputted from the adjustable desired inner-state correction unit, and an output from the inner-state measuring unit, and outputs the calculated inner-state error correction to the elastic body actuator to compensate for an inner-state error by controlling the measured value of the output of the elastic body actuator to be set to the desired value of the output; and a correcting output control unit that carries out a switching operation among a state in which the adjustable desired inner-state correction unit is used, a state in which no adjustable desired inner-state correction unit is used, and a state in which an update of the output from the adjustable desired inner-state correction unit is stopped.

6. A control apparatus for an elastic body actuator comprising:

a processor;

an inner-state measuring unit that measures an inner state of the elastic body actuator;

an output measuring unit that measures an output of the elastic body actuator;

an output error compensation unit to which a desired value of the output of the elastic body actuator and a measured value of the output of the elastic body actuator measured by the output measuring unit are inputted so as to compensate for an output error;

a desired inner-state determination unit that determines a desired value of the inner state of the elastic body actuator based on the desired value of the output of the elastic body actuator;

an adjustable desired inner-state correction unit that, when an error occurs between the desired value of the output of the elastic body actuator and the measured value of the output of the elastic body actuator, determines, using the processor, a desired correcting value of the inner state so as to make the error smaller;

an inner-state error compensation unit that calculates an inner-state error correction based on the desired value for the inner state outputted from the desired inner-state determination unit, the desired correcting value for the inner state outputted from the adjustable desired inner-state correction unit, and an output from the inner-state measuring unit, and outputs the calculated inner-state error correction to the elastic body actuator to compensate for an inner-state error by controlling the measured value of the output of the elastic body actuator to be set to the desired value of the output; and a correcting output control unit that carries out a switching operation between a state that allows the output from the adjustable desired inner-state correction unit to pass through a low-pass filter and a state that does not allow the output to pass therethrough.

7. The control apparatus for an elastic body actuator according to claim 5, wherein the adjustable desired inner-state correction unit further comprises:

a determination unit that receives a repetition signal from the desired track generation unit by the adjustable desired inner-state correction unit, and when the determination unit has determined that tracks of the elastic body actuator, obtained when desired values of the elastic body actuator are time-sequentially aligned, are repetitive, determines to use the adjustable desired inner-state correction unit.

8. The control apparatus for an elastic body actuator according to claim 7, wherein upon using the adjustable desired inner-state correction unit, the correcting output control unit determines to stop updating the output of the adjustable desired inner-state correction unit, when the elastic body actuator has an output error that is smaller than a predetermined threshold value.

9. The control apparatus for an elastic body actuator according to claim 5, wherein the correcting output control unit comprises a collision detection unit that detects a fact that the elastic body actuator has collided with an object so that, upon detection of collision by the collision detection unit, the correcting output control unit determines to stop updating the output of the adjustable desired inner-state correction unit.

10. The control apparatus for an elastic body actuator according to claim 5, wherein the correcting output control unit determines not to use the adjustable desired inner-state correction unit when starting the elastic body actuator.

11. The control apparatus for an elastic body actuator according to claim 6, wherein the correcting output control unit further comprises a low-pass filter that allows the output to pass therethrough for a predetermined period of time, when a state where the adjustable desired inner-state correction unit is not used is switched to a state where the adjustable desired inner-state correction unit is used, or when a state where the output of the adjustable desired inner-state correction unit is stopped without being updated is switched to a state where the output thereof is updated.

12. A method for controlling an elastic body actuator, comprising:

measuring an inner state of the elastic body actuator with an inner-state measuring unit;

measuring an output of the elastic body actuator with an output measuring unit;

compensating an output error with an output error compensation unit by inputting a desired value of the output of the elastic body actuator and a measured value of the output of the elastic body actuator measured by the output measuring unit;

determining a desired value of the inner state of the elastic body actuator based on the desired value of the output of the elastic body actuator with a desired inner-state determination unit;

determining with an adjustable desired inner-state correction unit using a processor, when an error occurs between the desired value of the output of the elastic body actuator and the measured value of the output of the elastic body actuator, a desired correcting value of the inner state so as to make the error smaller based on a reference model so that, when an error occurs among the output desired value, an output of the reference model, and the output of the elastic body actuator, values, obtained by multiplying the desired value of the output and a state variable of the reference model by a gain that makes the error smaller, are added to each other by the adjustable desired inner-state correction unit so as to be set as the desired correcting value of the inner state; and compensating an inner-state error with an inner-state error compensation unit by inputting therein an output from the output error compensation unit, a desired value for the inner state outputted from the desired inner-state determination unit, a desired correcting value for the inner state outputted from the adjustable desired inner-state correction unit, and an output from the inner-state measuring unit, the method comprising, based on the inner-state error that has been compensated for by the inner-state error compensation unit, controlling the measured value of the output of the elastic body actuator to be set to the desired value of the output.

13. A non-transitory computer readable medium having stored thereon a program for a control apparatus for an elastic body actuator, allowing a computer to function as:

an output error compensation unit to which a desired value of an output of the elastic body actuator and a measured value of the output of the elastic body actuator measured by an output measuring unit that measures the measured value of the output of the elastic body actuator are inputted so as to compensate for an output error;

a desired inner-state determination unit that determines a desired value of the inner state of the elastic body actuator based on the desired value of the output of the elastic body actuator;

an adjustable desired inner-state correction unit that, when an error occurs between the desired value of the output of the elastic body actuator and the measured value of the output of the elastic body actuator, determines a desired correcting value of the inner state so as to make the error smaller, the adjustable desired inner-state correction unit comprising a reference model so that, when an error occurs among the output desired value, an output of the reference model, and the output of the elastic body actuator, values, obtained by multiplying the desired value of the output and a state variable of the reference model by a gain that makes the error smaller, are added to each other by the adjustable desired inner-state correction unit so as to be set as the desired correcting value of the inner state; and an inner-state error compensation unit that allows an output from the output error compensation unit, a desired value for the inner state outputted from the desired inner-state determination unit, a desired correcting value for the inner state outputted from the adjustable desired inner-state correction unit, and an output from an inner-state measuring unit that measures the inner state of the elastic body actuator to be inputted therein so that an inner-state error is compensated, wherein based on the inner-state error that has been compensated for by the inner-state error compensation unit, the measured value of the output of the elastic body actuator is controlled to be set to the desired value of the output.

* * * * *